(12) United States Patent
Karmarkar

(10) Patent No.: US 9,166,823 B2
(45) Date of Patent: *Oct. 20, 2015

(54) GENERATION OF A CONTEXT-ENRICHED MESSAGE INCLUDING A MESSAGE COMPONENT AND A CONTEXTUAL ATTRIBUTE

(75) Inventor: Amit Vishram Karmarkar, Palo Alto, CA (US)

(73) Assignee: U OWE ME, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/422,313

(22) Filed: Apr. 13, 2009

(65) Prior Publication Data
US 2009/0215479 A1   Aug. 27, 2009

Related U.S. Application Data

(63) Continuation-in-part of application No. 11/519,600, filed on Sep. 11, 2006, now Pat. No. 7,551,935, which is a continuation-in-part of application No. 11/231,575, filed on Sep. 21, 2005, now Pat. No. 7,580,719.

(60) Provisional application No. 61/161,763, filed on Mar. 19, 2009.

(51) Int. Cl.
*H04W 4/00* (2009.01)
*H04L 12/58* (2006.01)
(Continued)

(52) U.S. Cl.
CPC ............ *H04L 12/5895* (2013.01); *H04L 51/38* (2013.01); *H04L 67/18* (2013.01);
(Continued)

(58) Field of Classification Search
CPC ...................................................... H04W 4/14

USPC ................................ 455/466, 403, 500, 575.9
See application file for complete search history.

(56) References Cited

U.S. PATENT DOCUMENTS

| 4,959,785 A | 9/1990 | Yamamoto et al. |
| 5,493,692 A | 2/1996 | Theimer et al. |

(Continued)

FOREIGN PATENT DOCUMENTS

| WO | WO-2007104487 | 9/2007 |
| WO | WO-2007104487 | 9/2007 |

OTHER PUBLICATIONS

Author(s) unknown, Voice SMS—Client & Clientless Solutions Fun Talk SMS, V2V SMS, VoiceSMSData Sheet 1, publication date unknown (copyright 2008), published by Movius, available http://www.moviuscorp.com/files/voice_sms.pdf, (last accessed Mar. 21, 2010).

(Continued)

*Primary Examiner* — Jinsong Hu
*Assistant Examiner* — Stephen M D Agosta

(57) ABSTRACT

Messaging Service Plus Context Data. A message of a specified mobile device communications protocol is parsed. The message is analyzed to identify a message data. A signal associated with the message is evaluated to determine a context data. The context data provides a contextual attribute of the message. The message data is algorithmically associated with the context data. Further, the other message includes the message data and the context data. A context enhancement data is determined to enrich a meaning of the context data. The context enhancement data is acquired from a database. The other message may be generated. The other message includes the message data, the context data and context enhancement data.

6 Claims, 19 Drawing Sheets

(51) Int. Cl.
*H04M 1/725* (2006.01)
*H04W 4/02* (2009.01)
*H04W 4/18* (2009.01)
*H04L 29/08* (2006.01)
*H04W 4/14* (2009.01)

(52) U.S. Cl.
CPC ...... *H04M1/72547* (2013.01); *H04M 1/72569* (2013.01); *H04W 4/02* (2013.01); *H04W 4/185* (2013.01); *H04M 1/72552* (2013.01); *H04M 1/72572* (2013.01); *H04W 4/026* (2013.01); *H04W 4/027* (2013.01); *H04W 4/14* (2013.01)

(56) References Cited

U.S. PATENT DOCUMENTS

| | | | |
|---|---|---|---|
| 5,500,936 A * | 3/1996 | Allen et al. | 715/808 |
| 5,517,409 A | 5/1996 | Ozawa et al. | |
| 5,588,141 A * | 12/1996 | Smith et al. | 719/315 |
| 5,797,098 A | 8/1998 | Schroeder et al. | |
| 6,169,911 B1 * | 1/2001 | Wagner et al. | 455/566 |
| 6,377,965 B1 * | 4/2002 | Hachamovitch et al. | 715/203 |
| 6,473,621 B1 | 10/2002 | Heie | |
| 6,560,456 B1 | 5/2003 | Lohtia et al. | |
| 6,611,755 B1 * | 8/2003 | Coffee et al. | 701/213 |
| 6,731,940 B1 | 5/2004 | Nagendran | |
| 6,750,883 B1 | 6/2004 | Parupudi et al. | |
| 6,785,869 B1 * | 8/2004 | Berstis | 715/210 |
| 6,813,507 B1 | 11/2004 | Gress et al. | |
| 6,816,578 B1 | 11/2004 | Kredo et al. | |
| 6,898,518 B2 | 5/2005 | Padmanabhan | |
| 6,963,839 B1 | 11/2005 | Ostermann et al. | |
| 6,964,020 B1 | 11/2005 | Lundy | |
| 6,966,035 B1 | 11/2005 | Suess et al. | |
| 6,990,180 B2 | 1/2006 | Vuori | |
| 6,993,553 B2 | 1/2006 | Kaneko et al. | |
| 7,072,956 B2 | 7/2006 | Parupudi et al. | |
| 7,177,902 B2 | 2/2007 | Hubbard | |
| 7,181,387 B2 | 2/2007 | Ju et al. | |
| 7,207,004 B1 | 4/2007 | Harrity | |
| 7,254,773 B2 | 8/2007 | Bates et al. | |
| 7,272,406 B2 | 9/2007 | Chava et al. | |
| 7,293,074 B1 | 11/2007 | Jellinek et al. | |
| 7,305,230 B2 | 12/2007 | Zhigang | |
| 7,315,902 B2 | 1/2008 | Kirkland | |
| 7,359,714 B2 | 4/2008 | Parupudi et al. | |
| 7,363,357 B2 | 4/2008 | Parupudi et al. | |
| 7,366,500 B1 * | 4/2008 | Yalovsky et al. | 455/414.1 |
| 7,424,682 B1 | 9/2008 | Pupius et al. | |
| 7,551,935 B2 | 6/2009 | Karmarkar | |
| 7,580,719 B2 | 8/2009 | Karmarkar | |
| 7,738,912 B1 * | 6/2010 | Hawkins et al. | 455/550.1 |
| 7,742,774 B2 * | 6/2010 | Oh et al. | 455/456.1 |
| 7,869,796 B2 * | 1/2011 | Lee et al. | 455/412.2 |
| 2002/0077135 A1 | 6/2002 | Hyon | |
| 2002/0173294 A1 | 11/2002 | Nemeth et al. | |
| 2002/0187794 A1 | 12/2002 | Fostick et al. | |
| 2002/0193996 A1 | 12/2002 | Squibbs et al. | |
| 2002/0198715 A1 | 12/2002 | Belrose | |
| 2003/0023424 A1 | 1/2003 | Weiner | |
| 2003/0078033 A1 | 4/2003 | Sauer et al. | |
| 2003/0085989 A1 | 5/2003 | Tay | |
| 2003/0125927 A1 * | 7/2003 | Seme | 704/3 |
| 2003/0133599 A1 * | 7/2003 | Tian et al. | 382/118 |
| 2003/0144895 A1 | 7/2003 | Aksu et al. | |
| 2003/0186716 A1 | 10/2003 | Dorenbosch et al. | |
| 2003/0207701 A1 | 11/2003 | Rolnik et al. | |
| 2003/0236658 A1 | 12/2003 | Yam | |
| 2004/0024683 A1 | 2/2004 | Morciniec et al. | |
| 2004/0034561 A1 | 2/2004 | Smith | |
| 2004/0044517 A1 | 3/2004 | Palmquist | |
| 2004/0092272 A1 | 5/2004 | Valloppillil | |
| 2004/0102201 A1 | 5/2004 | Levin | |
| 2004/0102956 A1 | 5/2004 | Levin | |
| 2004/0110493 A1 | 6/2004 | Alvarez et al. | |
| 2004/0122979 A1 | 6/2004 | Kirkland | |
| 2004/0158471 A1 | 8/2004 | Davis et al. | |
| 2004/0179545 A1 | 9/2004 | Erola et al. | |
| 2004/0194141 A1 | 9/2004 | Sanders | |
| 2004/0215526 A1 | 10/2004 | Luo et al. | |
| 2004/0221256 A1 | 11/2004 | Martin et al. | |
| 2004/0221260 A1 | 11/2004 | Martin et al. | |
| 2004/0235503 A1 | 11/2004 | Koponen et al. | |
| 2004/0248591 A1 | 12/2004 | Fish | |
| 2004/0253963 A1 | 12/2004 | Park et al. | |
| 2004/0266462 A1 | 12/2004 | Chava et al. | |
| 2005/0003837 A1 | 1/2005 | Midkiff et al. | |
| 2005/0004840 A1 | 1/2005 | Wanninger | |
| 2005/0027608 A1 | 2/2005 | Wiesmuller et al. | |
| 2005/0027664 A1 * | 2/2005 | Johnson et al. | 706/12 |
| 2005/0038892 A1 | 2/2005 | Huang et al. | |
| 2005/0066044 A1 | 3/2005 | Chaskar et al. | |
| 2005/0080628 A1 * | 4/2005 | Kuperstein | 704/270.1 |
| 2005/0128967 A1 | 6/2005 | Scobbie | |
| 2005/0171944 A1 | 8/2005 | Palmquist | |
| 2005/0188273 A1 * | 8/2005 | Angelo et al. | 714/39 |
| 2005/0191963 A1 | 9/2005 | Hymes | |
| 2005/0198304 A1 | 9/2005 | Oliver et al. | |
| 2005/0221820 A1 * | 10/2005 | Ruetschi | 455/432.3 |
| 2005/0267749 A1 | 12/2005 | Yamada et al. | |
| 2006/0019724 A1 * | 1/2006 | Bahl et al. | 455/574 |
| 2006/0135181 A1 | 6/2006 | Dale et al. | |
| 2006/0167992 A1 * | 7/2006 | Cheung et al. | 709/204 |
| 2006/0212621 A1 | 9/2006 | Ash et al. | |
| 2006/0223518 A1 * | 10/2006 | Haney | 455/420 |
| 2007/0027673 A1 | 2/2007 | Moberg | |
| 2007/0032244 A1 * | 2/2007 | Counts et al. | 455/456.1 |
| 2007/0076877 A1 | 4/2007 | Camp et al. | |
| 2007/0130170 A1 | 6/2007 | Forney | |
| 2007/0197229 A1 * | 8/2007 | Kalliola et al. | 455/456.1 |
| 2007/0208813 A1 | 9/2007 | Blagsvedt et al. | |
| 2007/0254593 A1 * | 11/2007 | Jollota et al. | 455/67.11 |
| 2008/0005068 A1 | 1/2008 | Dumais et al. | |
| 2008/0025482 A1 | 1/2008 | Susama et al. | |
| 2008/0043718 A1 | 2/2008 | Chu | |
| 2008/0059152 A1 | 3/2008 | Fridman et al. | |
| 2008/0076409 A1 | 3/2008 | Hlnrlkus et al. | |
| 2008/0133228 A1 | 6/2008 | Rao | |
| 2008/0133336 A1 | 6/2008 | Altman et al. | |
| 2008/0243619 A1 | 10/2008 | Sharman et al. | |
| 2008/0311934 A1 | 12/2008 | Soderstrom | |
| 2009/0055739 A1 | 2/2009 | Murillo et al. | |
| 2009/0082042 A1 | 3/2009 | Harendra et al. | |
| 2009/0124272 A1 | 5/2009 | White et al. | |
| 2009/0129372 A1 | 5/2009 | Pandey et al. | |
| 2009/0147778 A1 | 6/2009 | Wanless et al. | |
| 2009/0163183 A1 | 6/2009 | O'Donoghue et al. | |
| 2009/0175499 A1 | 7/2009 | Rosenblatt | |
| 2009/0254529 A1 | 10/2009 | Goldentouch | |
| 2009/0282030 A1 | 11/2009 | Abbott et al. | |
| 2010/0048290 A1 | 2/2010 | Baseley et al. | |

OTHER PUBLICATIONS

Yasuto Nakanishi et al., "Context Aware Messaging Service: A Dynamic Messaging Delivery Using Location Information and Schedule Information," Personal Technologies (2000) 4:221-224.

"About ContractBuddy"; http://www,contractbuddy.com/aboutCB/features.htm.

"Electronic negotiations, media, and transactions in socioeconomic interactions"; Yuan; http://intemeg.org!enegotiationlresourceslonline__info,html.

"Distributed PeCo-Mediator: Finding Partners via Personal Connections" Ogata etal.

"What Can Computer Programs Do to Facilitate Negotiation Processes?"; Chaudhury. et al.; 1991 ACM 0-89791-456-2/91/0010/0269.

"Speech Centric Multimodal Interfaces for Mobile Communication Systems"; Kvale et al.; Telektronikk 2.2003; p. 104-117.

(56) References Cited

OTHER PUBLICATIONS

"Dumas—Adaptation and Robust Information Processing for Mobile Speech Interfaces"; Jokinen et al.

"Googie SMS: How to Use"; http://www.google.com/smslhowtouse.html.

Author(s) unknown, Voice SMS—Client & Clientless Solutions Fun Talk SMS, V2V SMS, VoiceSMSData Sheet 1,publication date unknown (copyright 2008), published by Movius.

Yasuto Nakanishi et al "Context Aware Messaging Service:A Dynamic Messaging Delivery Using Location Information and Schedule Information," Personal Technologies (2000)Abstract.

* cited by examiner

| TEXT OF MESSAGE 300 | MEDIA OF MESSAGE 302 | USER ACTION 304 | CONTEXT/CONTEXT ENHANCEMENT DATA ASSOCIATED WITH MESSAGE 306 | PRESENTATION OF CONTEXT/CONTEXT ENHANCEMENT DATA 308 | ADDITIONAL USER OPTIONS 310 |
|---|---|---|---|---|---|
| "WE ARE HERE" 300A | NONE 302A | CLICK ON "WE" AND/OR CLICK ON "HERE" 304A | GLOBAL POSITIONING SYSTEM DATA<br><br>MOBILE DEVICE IDENTIFICATION DATA OF OTHER MOBILE DEVICES WITHIN RANGE OF SENDER'S MOBILE DEVICE AT TIME TEXT MESSAGE SENT<br><br>SOCIAL NETWORK DATA HYPERLINKS 306A | IF CLICK ON 'WE' GUI OF MOBILE DEVICE PRESENTS A LIST OF MEMBERS OF CONTACT LIST OF SENDER'S MOBILE DEVICE THAT ARE WITHIN RANGE OF SENDER'S MOBILE DEVICE.<br><br>IF CLICK ON HERE' GUI OF MOBILE DEVICE PRESENTS AN INTERNET MAP OF LOCATION OF SENDING MOBILE DEVICE AT TIME TEXT MESSAGE SENT. 308A | LINK TO SOCIAL NETWORKING PAGE OF MEMBERS OF CONTACT LIST OF SENDER'S MOBILE DEVICE THAT ARE WITHIN RANGE OF SENDER'S MOBILE DEVICE.<br><br>LINK TO A BUSINESS REVIEW WEBSITE WHERE REVIEWS OF THE BUSINESS AT THE LOCATION OF SENDING MOBILE DEVICE AT TIME TEXT MESSAGE SENT. 310A |
| "I LOVE YOU" 300B | IMAGE OF A ROSE TAKEN WITH DIGITAL CAMERA OF SENDER'S MOBILE DEVICE. 302B | CLICK ON IMAGE OF ROSE 304B | IMAGE DATA HYPERLINK 306B | NONE 308B | LINK TO ROSES.COM 310B |
| "I FEEL LIKE THIS" 300C | DIGITAL AUDIO ENCODING OF A CHILD LAUGHING THAT SENDER RECORDED ON MOBILE DEVICE. 302C | CLICK ON "THIS" 304C | AUDIO DATA HYPERLINK 306C | MOBILE DEVICE AUDIO SYSTEM PRODUCES LAUGHTER WITH SPEAKERS. 308C | LINK TO WEBSITE WHERE CAN PURCHASE MP3 VERSION OF SONG "I'M HAPPY" 310C |
| "HAPPY BIRTHDAY SON" 300D | VIDEO OF RECEIVER'S PARENTS SINGING "HAPPY BIRTHDAY". 302D | CLICK ON "HAPPY BIRTHDAY SON" 304D | VIDEO DATA HYPERLINK 306D | GUI OF MOBILE DEVICE PLAYS VISUAL ELEMENT OF VIDEO, SPEAKERS OF MOBILE DEVICE PRODUCE SINGING WITH SPEAKERS. 308D | LINK TO BOOK RETAIL WEBSITE WHERE CAN ACCESS GIFT CERTIFICATE THAT WAS PRESENT FROM PARENTS. 310D |

FIGURE 3A

| | | | | |
|---|---|---|---|---|
| NONE 300E | DIGITAL PHOTOGRAPH OF BAR CODE ON BRAND X WINE BOTTLE LABEL 302E | CLICK ON PHOTOGRAPH 304E | BAR CODE DATA HYPERLINK 306E | GUI OF MOBILE DEVICE PRESENTS TEXTUAL INFORMATION REGARDING YEAR, PRICE AND VARIETAL TYPE OF BRAND X WINE 308E | LINK TO THE WEBSITE OF WINE MERCHANT THAT SELLS BRAND X WINE. LINK TO WINE MAGAZINE WEBSITE TO READ A REVIEW OF BRAND X WINE. 310E |
| "GREAT RESTAURANT!" 300F | NONE 302F | CLICK ON "RESTAURANT" 304F | RADIO FREQUENCY-IDENTIFICATION CONTEXT DATA HYPERLINK 306F | GUI OF MOBILE DEVICE PRESENTS NAME OF RESTAURANT 308F | LINK TO A BUSINESS REVIEW WEBSITE WHERE REVIEWS OF THE RESTAURANT 310F |
| "I'LL HEAD IN THIS DIRECTION" 300G | NONE 302G | CLICK ON "DIRECTION" 304G | COMPASS SENSOR DATA INDICATING MOBILE DEVICE POINTING NORTH 306G | GUI OF MOBILE DEVICES PRESENTS TERM "NORTH" 308G | NONE 310G |
| "I'M LEAVING WORK NOW EXPECT ME SOON". *SENDER TILTS MOBILE DEVICE FORWARD AFTER ENTERING TEXT-GESTURE IS PREPROGRAMMED TO HAVE SMS SERVER DETERMINE CURRENT TRAFFIC CONDITIONS AND CALCULATE ESTIMATED DRIVING TIME. 300H | NONE 302H | CLICK ON "EXPECT ME SOON" 304H | GYROSCOPE DATA AND/OR ACCELEROMETER DATA. SERVER CAPTURES LOCAL TRAFFIC DATA. CALCULATES EXPECTED TRAVEL TIME OF SENDER TO AND ASSOCIATES WITH TEXT MESSAGE HYPERLINK 306H | GUI OF MOBILE DEVICES PRESENTS ESTIMATED DRIVING TIME OF SENDER FROM SENDER'S PRESENT LOCATION 308H | NONE 310H |

FIGURE 3B

| | | | | |
|---|---|---|---|---|
| "I LOVE TOWELS-R-US!" 300I | NONE 302I | CLICK ON TEXT OF MESSAGE 304I | WIRELESS NETWORK DATA HYPERLINK 306I | GUI OF MOBILE DEVICE PRESENTS AN INTERNET MAP OF LOCATION OF TOWELS-R-US STORE. 308I | LINK TO TOWELS-R-US STORE WEBSITE. 310I |
| "I'M WITH BOB" 300J | NONE 302J | CLICK ON 'BOB' 304J | CONTACTS LIST DATA 306J | GUI OF MOBILE DEVICES PRESENTS BOB'S CONTACT INFORMATION AS STORED IN THE SENDER'S MOBILE DEVICE. 308J | NONE 310J |
| "CALL ME AT HOME" 300K | NONE 302K | CLICK ON TEXT OF MESSAGE 304K | REFERENT TO THE OTHER MESSAGE CONTEXT DATA SOCIAL NETWORK CONTEXT DATA 306K | GUI OF MOBILE DEVICES PRESENTS PREVIOUS SMS WITH SENDER'S TELEPHONE NUMBER. "MY NUMBER IS 555-555-5555, CALL ME" 308K | LINK TO SOCIAL NETWORKING PAGE OF SENDER. 310K |

FIGURE 3C

GENERATION OF A CONTEXT-ENRICHED MESSAGE INCLUDING A MESSAGE COMPONENT AND A CONTEXTUAL ATTRIBUTE

CLAIM OF PRIORITY

This application is a continuation-in-part of application Ser. No. 11/519,600, filed Sep. 11, 2006, which is a continuation-in-part of Ser. No. 11/231,575, filed on Sep. 21, 2005. Additionally, this application claims the benefit of U.S. Provisional Application No. 61/161,763, filed on Mar. 19, 2009. These applications are incorporated herein by reference.

FIELD OF TECHNOLOGY

This disclosure relates generally to mobile device communication and more particularly to a short messaging service and a multimedia messaging service.

BACKGROUND

A mobile phone may include a text messaging application. A sending user may compose and send a text with the text messaging application. A receiving user may receive the text message. The text message may generically refer a location. For example, the text message may include the term "here". The other user may not be able to understand the meaning of the term without more contextual information to describe the term. The text messaging application may have functional limitations that discourage contextual descriptions with the text. For example, the sending user sending the text message may be limited by the number of possible characters which may be included in the body of the text. The text may be read by receiving user at a temporally and/or geographically remote distance from sending user. Consequently, the meaning of some terms in the text message may be lost. Such an event may diminish the effectiveness of the text messaging mode of communication.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

Several methods and a system of a generation of a context-enriched message including a message component and a contextual attribute are disclosed.

An exemplary embodiment provides a method of a messaging service server. A message generated by a mobile device is provided. A message component of the message is identified. A contextual attribute of the mobile device is determined. A context data is derived from the contextual attribute. The message component is associated with the context data. Another message comprising the message component and the context data is generated.

An exemplary embodiment provides a system. The system includes a communications server, a parser module, a text analysis module, context analysis module, a collation module, a message module, and a context enhancement module. The parser module of the communications server parses a message of a specified communications protocol. The text analysis module determines meaning of a message data. The context analysis module determines a context data providing a contextual attribute of at least one of the message data and a device that generated or received the message, and derives a context data from the contextual attribute, and wherein the contextual attribute is related to the meaning of the message data. The context enhancement module determines a context enhancement data to enrich a meaning of the context data. The context enhancement module determines a context enhancement data to acquire the context enhancement data from a database.

The collation module associates the message data with the context data. Further, the message module generates an other message. The other message includes the message data and the context data.

An exemplary embodiment provides a computer-implemented method. A message is provided with a mobile device. A contextual attribute of the mobile device relevant to a message component is determined. The message component and the contextual attribute are associated.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying Drawings and from the Detailed Description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIG. 3 is a tabular view that illustrates various examples of the actions of user based on the text message, according to one embodiment.

Other features of the present embodiments will be apparent from the accompanying Drawings and from the Detailed Description that follows.

DETAILED DESCRIPTION

Several methods and a system of short message service plus context data are disclosed. Although the embodiments have been described with reference to specific example embodiments, it will be evident that various modifications and changes may be made to these embodiments without departing from the broader spirit and scope of the various embodiments.

Figure 1:
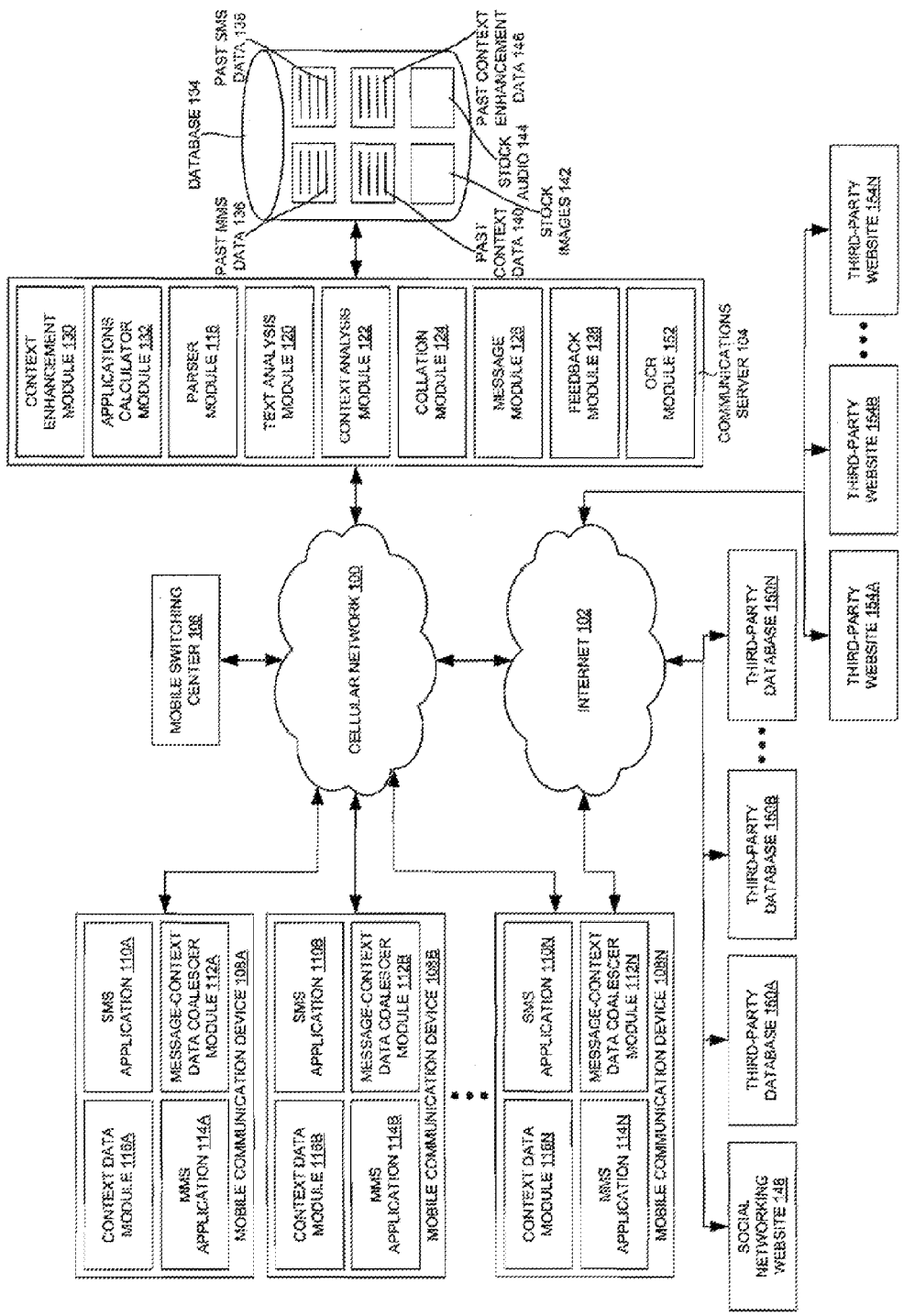
FIG. 1 is a system view of a messaging service server, according to one embodiment.

FIG. 1 is a system view of a messaging service server, according to one embodiment. Particularly, FIG. 1 illustrates a cellular network 100, an Internet 102, a communications server 104, a mobile switching center 106, a mobile communication device 108 A-N, a short message service (SMS) application 110 A-N, a message-context data coalesce module 112 A-N, a multimedia messaging service (MMS) application 114 A-N, a context data module 116 A-N, a parser module 118, a text analysis module 120, a context analysis module 122, a collation module 124, a message module 126, a feedback module 128, a context enhancement module 130, an applications calculator module 132, a database 134, a past MMS data 136, a past SMS data 138, a past context data 140, a stock image 142, a stock audio 144, a past context enhancement data 146, a social networking website 148, a third-party database 150 A-N, an OCR module 152, and a third party website 154 A-N, according to one embodiment.

In the one embodiment, the cellular network 100 is communicatively coupled to the Internet 102, the mobile switching center 106, the communications server 104 and the mobile communication device 108 A-N. Also, the cellular network 100 is communicatively coupled to the social networking website 148, the third-party database 150 A-N, and the third party website 154 A-N. The mobile communication device 108 A-N is connected to a cellular network 100 via a cell site. The communications server 104 includes the parser module 118, the text analysis module 120, the context analysis module 122, the collation module 124, the message module 126, the feedback module 128, the context enhancement module 130, the applications calculator module 132, and the OCR module 152. The communications server 104 is communicatively coupled to the database 134. The database 134 includes the past MMS data 136, the past SMS data 138, the past context data 140, the stock image 142, the stock audio 144, and the past context enhancement data 146.

The cellular network 100 includes a number of radio cells each served by a cell site (e.g. a fixed transmitter). The cell site includes a tower or other elevated structure for mounting antennas, and one or more sets of transmitter/receivers, digital signal processors, control electronics, a GPS receiver for timing (i.e. for CDMA2000 or IS-95 systems), regular and backup electrical power sources, and a sheltering structure. The cellular network 100 communicates a voice or data communication of the mobile communication device 108A-N to another mobile communication device 108A-N and/or an other communication device via a circuit/switch network (e.g. a public switched telephone network (PSTN)) and/or the Internet 102. In other embodiments, the cellular network 100 may be coupled to a satellite network. The Internet 102 includes a global network of interconnected computers. The interconnected computers shares data by packet switching using the standardized Internet Protocol Suite (TCP/IP). In an example embodiment, a dedicate applied program interface (API) may interface the cellular network 100 and the Internet 102 in order to communicate the text data and/or the context between the cellular network 100 and the Internet 102.

The mobile switching center 106 includes a component of a Global System for Mobile communications (GSM) system. In an example embodiment, the mobile switching center 106 may operate the switching functions and manage the communications between the mobile communication device 108A-N and another network Public Switched Telephone Network (PSTN) (via the cellular network 100). The mobile switching center 106 may enable the mobile communication device 108A-N access to services such as Wireless Application Protocol (WAP), MMS, and Internet 102 access.

The mobile communication device 108A-N includes the SMS application 110A-N, the MMS application 114A-N, the context data module 116A-N and the message-context data coalescer module 112A-N.

The mobile communication device 108A-N is a long-range, electronic device used for mobile voice or data communication over the cellular network 100 and/or the Internet 102. The mobile communication device 108A-N communicates a context data to the communications server 104 via the cellular network 100 and/or the Internet 102. The mobile communication device 108A-N supports a number of accessories. The mobile communication device 108A-N may include a user interface of FIG. 4. The user interface may include a graphical user interface device 406 of FIG. 4, an audio interface device and a haptic interface device. The mobile communication device 108A-N may integrate data capture devices like a biometric data input device, a bar code reader, a Radio-frequency identification (RFID) device, or a Smart Card reader.

The mobile communication device 108A-N includes a short message service (SMS) application 110A-N. The SMS application 110A-N supports text messaging. The SMS application 110A-N includes both software functionality and hardware that enables the mobile communication device 108A-N to generate, transmit, receive and present an SMS text message.

The mobile communication device 108A-N supports a media message service (MMS) application 114A-N. The MMS application 114A-N includes both software functionality and hardware that enables the mobile communication device 108A-N to generate, transmit, receive and present a MMS message according to the MMS telecommunications standard.

The mobile communication device 108A-N includes a message-context data coalescer module 112A-N. The mobile communication device 108A-N coalesces data from the SMS application 110A-N, the MMS application 114A-N and the Context Data Module 116A-N into a set of related signals to be communicated by the mobile communication device 108A-N to the communications server 104.

The mobile communication device 108A-N supports Bluetooth (and/or other wireless protocols for exchanging data over short distances from fixed and/or mobile devices). The mobile communication device 108A-N may be used to create a personal area networks (PAN). In other example embodiments, the mobile communication device 108A-N may include an infrared camera. The mobile communication device 108A-N may include a camera. The mobile communication device 108A-N may include a digital video recorder. The mobile communication device 108A-N may include a MP3 player (including speakers). The mobile communication device 108A-N may include a radio device. In another example embodiment, the mobile communication device 108A-N may include a WAP browser application. The mobile communication device 108A-N may support email and a packet switching application for access to the Internet 102.

The communications server 104 includes the parser module 118, the text analysis module 120, the context analysis module 122 the collation module 124, the message module 126 and the feedback module 128. The communications server 104 may include a network-connected computer appliance that provides specific, dedicated applications to the cellular network 100. The communications server 104 may include a software functionality and/or hardware processor that runs a set of applications relating to, inter alia, SMS, MMS and context data operations. In an example embodiment, the specified communications protocol may be standardized SMS communications protocol of a GSM mobile communication system. In another example embodiment, the specified communications protocol is an MMS communications protocol. Other embodiments includes a satellite communications protocol and/or a landline network protocol.

The parser module 118 parses a message of a specified communications protocol. The text analysis module 120 analyzes the message to identify a text data of the SMS message or the MMS message. The context analysis module 122 evaluates a signal associated with the message to determine a context data providing a contextual attribute of the message. The context analysis module 122 processes the context data to enable a presentation of the context data with a user interface 450.

The collation module 124 associates the text data with the context data. The message module 126 generates another message comprising the text data and the context data. The message module 126 modifies the message to enable the context data to be rendered with the user interface.

The feedback module 128 determines a manually specified text of the message, and identifies a clarifying context data related to the manually specified text, and updates the message to correlate the manually specified text with the clarifying context data.

The context enhancement module 130 is a software functionality and/or a hardware circuit of the communications server 104. The context enhancement module 130 determines a context enhancement data to enrich a meaning of the context data. The context enhancement module 130 acquires the context enhancement data from a database. The database may be the database 134, the third-party database 150A-N, a social network website 148 and a third-party website 154A-N. The context enhancement module 130 acquires the context enhancement data.

The applications calculator module 132 processes a content data and/or a context enhancement data to ascertain another context enhancement data. The other context enhancement data is associated with an application of the mobile communication device 108A-N. For example, a mobile communication device 108A-N may include an application that causes the applications calculator module 132 to calculate travel time for current traffic conditions for a specified pre-selected set of routes. The communications server 104 may generate a MMS message. The MMS message may include an SMS from the mobile communication device 108A-N and a data indicating the calculated travel time. The MMS message is communicated to another mobile device. The other mobile device displays the SMS text and the calculated travel time.

The database 134 is communicatively coupled with the communications server 104. The database 134 includes the past MMS data 136, the past SMS data 138, the past context data 140, the set of stock images 142, the stock audio 144, the past context enhancement data 146. The context enhancement module 130 of the communications server 104 uses data of the database 134 to enhance a message generated by the mobile communication device 108A-N and/or the communications server 104. The social networking website 148 includes a social network service that focuses on building online communities of people who share interests and/or activities, or who are interested in exploring the interests and activities of others. The third-party database 150A-N is a database associated with a third-party. For example, a third-party may be a governmental entity, a statistics producing entity, a Web search engine that indexes data, a scholarly database. The third-party website 154A-N may be collection of related Web pages, images, videos or other digital assets that are hosted on at least one Web server, usually accessible via the Internet.

The OCR module 152 uses optical character recognition (OCR) technology to convert images into data. The OCR module 152 also converts images of text (typed, handwritten, etc.) into characters. The OCR module 152 may convert an optical representation of data into actual machine-readable data. The OCR module 152 may convert a bar code image into machine-readable data. The communications server 104 then processes the data.

Figure 2:
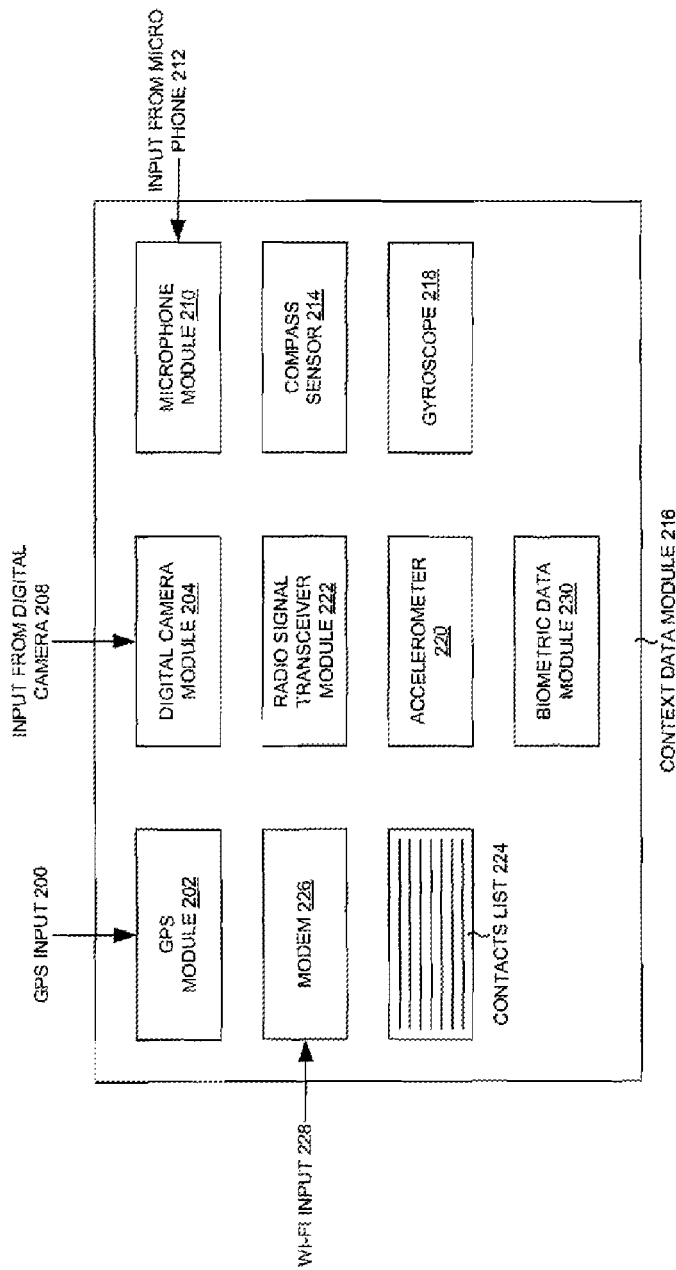
FIG. 2 is an exploded view of a mobile communication device that illustrates the various inbuilt modules, according to another embodiment.

The mobile communication device 108A-N includes a context data module 216. FIG. 2 is an exploded view of a mobile communication device 108A-N that illustrates the various inbuilt modules, according to another embodiment. Particularly, FIG. 2 illustrates a Global Positioning System (GPS) input 200, a GPS module 202, a digital camera module 204, an input from digital camera 208, a microphone module 210, an input from microphone 212, a compass sensor 214, a context data module 216, a gyroscope 218, an accelerometer 220, a radio signal transceiver module 222, a contact list 224, a modem 226, a WI-FI input 228 and a biometric data module 230.

The context data module 216 includes both software functionality and hardware that collects context data. The context data module 216 collects and processes the context data. The context data may be collected according to a user specified instruction. For example, according to an example embodiment, a user may manually associate an image context data (e.g. a digital photograph taken with a digital camera of the mobile communication device 108A-N) with a specified term of an SMS text. The context data may be algorithmically collected. For example, the mobile communication device 108A-N may detect an environmental signal. Examples of possible environmental signals may include Wi-Fi signals, radio signals of other mobile communication devices, GPS signals, the orientation the mobile communication device 108A-N. The context data module 216 may retrieve an environment signal. The context data module 216 may identify the environment signal. The mobile communication device 108A-N may periodically and/or automatically communicate the environment signal to the communications server 104. A user may determine a set of environmental signals that may be periodically and/or automatically communicated to the communications server 104 via the cellular network 100. In another particular embodiment, the context data includes a global positioning system context data, an image context data, an audio context data, a video context data, a bar code context data, a radio frequency-identification context data, a compass sensor context data, a gyroscope context data, a wireless network context data, an accelerometer context data, a social network context data, a contacts list context data, a biometric context data and a referent to another message context data.

In an example embodiment, the context data module 216 includes the GPS module 202. The GPS module 202 includes a GPS receiver. The GPS module 202 calculates the location of the mobile communication device 108A-N with GPS input 200 received by a GPS receiver. The GPS input 200 includes data describing the timing of the signals sent by a set of GPS satellites with signals visible to the GPS receiver. The mobile communication device 108A-N communicates the GPS data to the communications server 104 via the cellular network 100. The communications server 104 algorithmically associates the location of the mobile communication device 108A-N with an SMS text and/or MMS content (e.g. a digital photograph of a landmark).

In the example embodiment, the context data module 216 includes the digital camera module 204. The digital camera module 204 includes a digital camera. A user takes a digital photograph with the digital camera (e.g. an input from digital camera 208). The mobile communication device 108A-N communicates the digital photograph to the communications server 104 via the cellular network 100.

In the example embodiment, the context data module 216 includes the microphone module 210. The input from microphone 212 may be a digital audio recording. The mobile communication device 108A-N communicates the digital audio recording to the communications server 104 via the cellular network 100.

In the example embodiment, the context data module 216 includes the compass sensor 214. The compass sensor 214 provides directional data information. For example, the directional data information may provide the direction the mobile communication device 108A-N in pointing at a particular user specified moment in time. The mobile communication device 108A-N may communicate the directional data information to the communications server 104 via the cellular network 100.

In the example embodiment, the context data module 216 includes the gyroscope 218. The gyroscope 218 measures the orientation of the mobile communication device 108A-N. A user assigns a specified meaning to a particular orientation of the mobile communication device 108A-N. The specified meaning is stored in the communications server 104. The mobile communication device 108A-N communicates the orientation the mobile communication device 108A-N to the communications server 104 via the cellular network 100.

In an example embodiment, the context data module 216 includes the accelerometer 220. The accelerometer 220 measures a non-gravitational acceleration of the mobile communication device 108A-N. A user assigns a meaning to a particular non-gravitational acceleration of the mobile communication device 108A-N. The meaning is stored in the communications server 104. The mobile communication device 108A-N communicates a value of the non-gravitational acceleration of the mobile communication device 108A-N or the meaning to a particular non-gravitational acceleration of the mobile communication device 108A-N to the communications server 104 via the cellular network 100.

In the example embodiment, the context data module 216 includes the radio signal transceiver module 222. The radio signal transceiver module 222 includes a radio signal transceiver. The radio signal transceiver module 222 may both receive and communicate a radio signal. The radio signal detects a radio signal that identifies another mobile communication device. The context data module 216 identifies the other mobile communication device. The mobile communication device 108A-N communicates the identity of the other mobile communication device to the communications server 104. The radio signal transceiver module 222 detects a WI-FI input 228. The WI-FI input 228 is a single carrier direct-sequence spread spectrum radio technology, a multi-carrier Orthogonal Frequency Division Multiplexing (OFDM) radio technology and/or any other signal utilized by a Wi-Fi device. The context data module 216 identifies the source of the Wi-Fi signal. The mobile communication device 108A-N communicates information regarding the Wi-Fi signal to the communications server 104.

The mobile communication device 108A-N includes a contact list 224. The mobile communication device 108A-N communicates a contact list 224 to the communications server 104. The context data module 216 identifies a radio signal from another mobile communication device as associated with a particular contact of the contact list 224. The mobile communication device 108A-N communicates the particular contact and the fact that the particular contact is within the range of the radio transceiver module 222 to the communications server 104.

The context data module 216 includes the biometric data module 230. The biometric data module 230 includes hardware and/or software functionalities for measuring and analyzing a set of biological data. The mobile communication device 108A-N includes a biometric input device. The biometric input device collects biometric data. The context data module 216 communicates the biometric data to the communications server 104. A user associates the biometric data with a particular portion of a short message and/or media message. In another example embodiment, the communications server 104 algorithmically associates the biometric data with the particular portion of a short message and/or media message based on a specified set of parameters.

For example, mobile communication device 108A-N may include a fingerprint reader. An external object may include a finger print reader. The mobile communication device 108A-N and the external object may also include a coupling device (e.g. a Bluetooth device). The user may input a fingerprint into the fingerprint reader of the mobile communication device 108A-N and the fingerprint reader of the external object. The mobile communication device 108A-N may then couple with the external object. The biometric data module 230 may collect the context data of the fingerprint and identify the fingerprint as that of the user. The context data module 216 may collect the context data of the coupling. The user may use the SMS application 110A to generate a SMS text: "I want this". The communications server 104 may algorithmically associate "this" with the external object. This association may then be communicated to the communications server 104. In another example, the biometric data module 230 may collect a fingerprint of a person who is a node of the user on a particular social networking website. The biometric data module 230 may collect the context data of the fingerprint. The mobile communication device 108A-N may then communicate the context data of the fingerprint. The communications server 104 may algorithmically associate the fingerprint with the node of the particular social network. The communications server 104 may retrieve information from a third-party database via the Internet 102. The communications server 104 may algorithmically associate the fingerprint with the information from the third-party database. For example, the third-party database may be a governmental fingerprint database with address and/or criminal information of the person. The communications server 104 may algorithmically associate the fingerprint with the address and/or criminal information of the person.

FIG. 3 is a tabular view that illustrates various examples of the actions of user based on the text message, according to one embodiment. Particularly, FIG. 3 illustrates a text of message field 300, a media of message field 302, an user action field 304, a context data/context enhancement data associated with message field 306, a presentation of context data field 308 and an additional user options 310. The text of message field has various fields showing examples of text message. For example, the text of message field may illustrate "We are here" field 300A, "I love you" field 300B, "I feel like this" 300C, "Happy Birthday Son" field 300D, none field 300E, "great restaurant" field 300F, "I'll head in this direction" field 300G, "I am leaving work now expect me soon" field 300H, "I love towels R-Us!" field 300I, "I'm with Bob" field 300J, and the "Call me at home" field 300K.

The media of message field 302 illustrates the kind of media depending on text of message field 300. The media of message field 302 may illustrate 'none' field 302A, the image of rose taken with digital camera of sender's mobile device field 302B, the digital audio encoding of a child laughing that sender has recorded on mobile device field 302C, the video receiver's parents singing "Happy Birthday" field 302D and the digital photograph of bar code on brand x wine bottle label field 302E.

The user action field 304 may illustrate the "click on 'We' and/or Click on 'Here' field 304A, Click on image of rose field 304B, Click on 'this' field 304C, Click on 'Happy Birthday Son' field 304D, Click on photograph field 304E, Click on 'restaurant' field 304F, Click on 'direction' Field 304G, Click on expect me soon field 304H, Click on text of message field 304I, Click on 'bob' field 304J, Click on text of message field 304K.

The context data/context enhancement data associated with the message field 306 may illustrate the GPS context data or mobile identification data of other mobile devices within range of sender's mobile device at time text message send or social network data field 306A, an image data field 306B, an audio data field 306C, a video data field 306D, a bar code data field 306E, a radio frequency identification context data field 306F, a compass sensor data indication mobile device pointing north field 306G, a gyroscope data and/or accelerometer data field 306H, a wireless network data field 306I, a contact list data field 306J, a referent to the other message data 306K. A hyperlink that links a web page to another web page is provided.

The presentation of context/context enhancement data field 308 illustrates various fields depending on the text of message field 300. For example, if the text of message 300 is "I love you" 300B and the user clicks on the image of 'rose' 304B. Then the presentation of context/context enhancement data field 308 may illustrate the GUI presenting the image of a 'rose'. A specified module of the communications server 104 may retrieve data associated with the presentation of context/context enhancement data field 308 from the Internet, the database of the communications server 104 and a third-party database 150A-N.

Similarly, the presentation of context data 308A-K illustrates various GUI depending on the text of message field 300A-K. Also, the presentation of context data 308A-K is based on the appropriate user action 304A-K. The additional user options field 310 illustrates a choice of user options relating to the presentation of context data field 308. For example, if the presentation of context data field 308 illustrates the GUI showing the image of a rose 304B. Then the additional user options 310 may provide a link to the user of the rose's seller's website 310B. Similarly, the additional user options field 310 may illustrate a variety of choice to the user (e.g., additional user options 310A-K) depending on the presentation of context data 308A-K.

Figure 4:
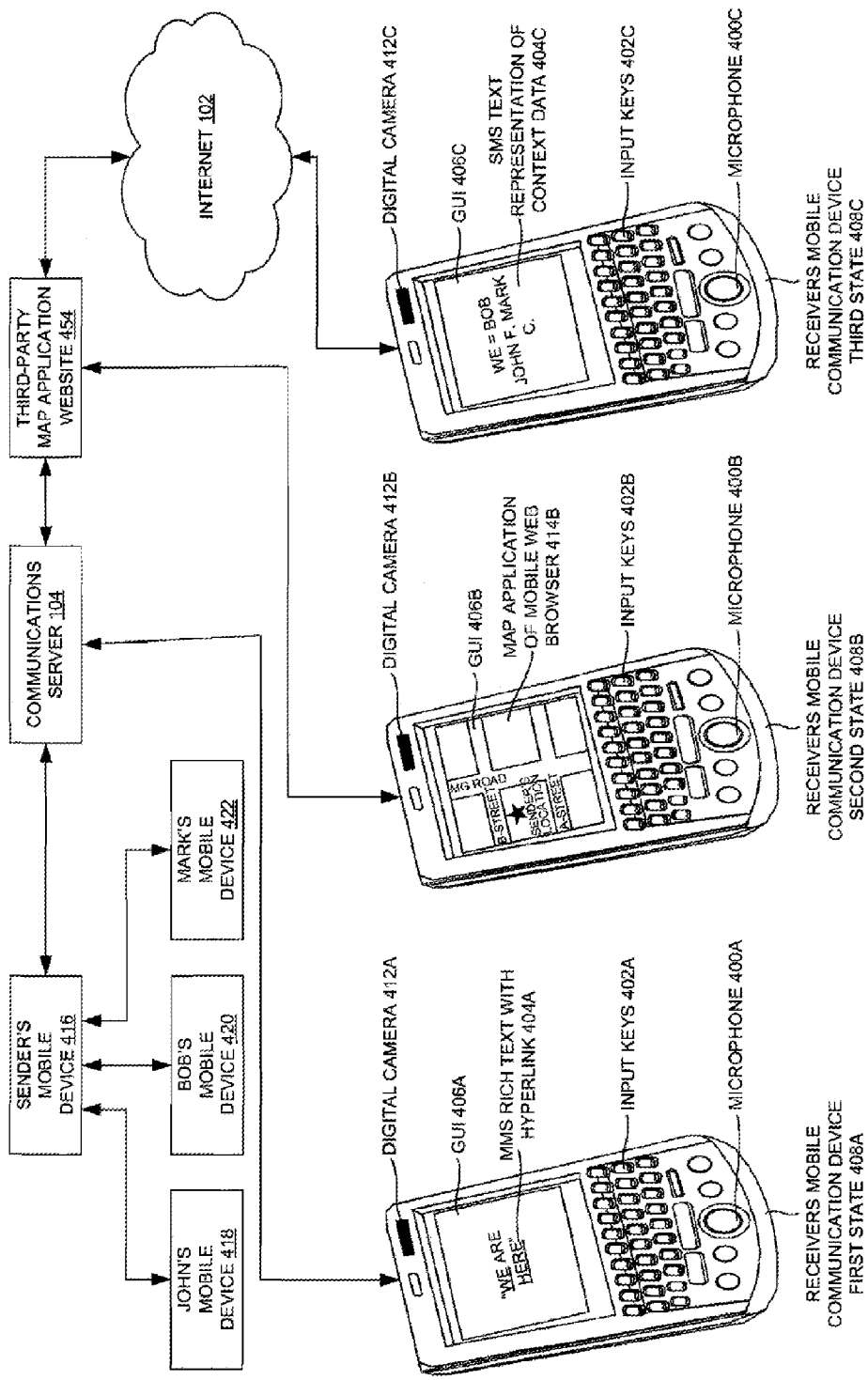
FIG. 4 is an user interface view illustrating an example from FIG. 3 of text message "we are here" and its appropriate presentation of context data, according to another embodiment.

FIG. 4 illustrates a user interface view of a receiver's mobile communication device 408A-C in three different states, according to a particular example embodiment. Each state of the receiver's mobile communication device 408A-C may be determined by information provided by the communications server 104 or the sender's mobile device 416.

The sender's mobile device 416 communicate an SMS text message, GPS data and other mobile device identification data to the communications server 104. The GPS data provides the location of the sender's mobile device 416 at the time the SMS text message was sent by the sender's mobile device 416. The other mobile device's identification data is acquired by the sender's mobile device 416.

For example, the other mobile devices may be John's mobile device 418, Bob's mobile device 420 and Mark's mobile device 422. These mobile devices may be within Bluetooth range of the sender's mobile device 416. The sender's mobile device 416 may use a Bluetooth operation to acquire the identities of the other mobile devices 418-422. The communications server 104 may process the information communicated by the sender's device according to the process of FIG. 16. The communications server 104 may generate an MMS message and communicate the MMS message to the receiver's mobile communication device. The MMS message may include the original text of the SMS text of the sender's mobile device 416. The MMS message may include the original text of the SMS and hyperlinks. The MMS may include a link to a third-party map application website 454 showing the GPS location of the sender's mobile device 416 at the time the SMS message was sent. The MMS message may include a hyperlink to a next text message including the text "We=Bob, John F., Mark C." The user of the receiver's mobile communication device 408A-C may click on the hyperlink embedded in the text "HERE" in the first state 408A and set the receiver's mobile communication device in a second state 408B with a GUI 406B presenting third-party map application website 454 showing the GPS location of the sender's mobile device 416 at the time the SMS message was sent. The user of the receiver's mobile communication device 408A-C may click on the hyperlink embedded in the text "We" in the first state 408A and set the receiver's mobile communication device 408A-C in the third state 408C with a GUI 406C presenting the text "WE=BOB, JOHN F., MARK C.".

Figure 5:
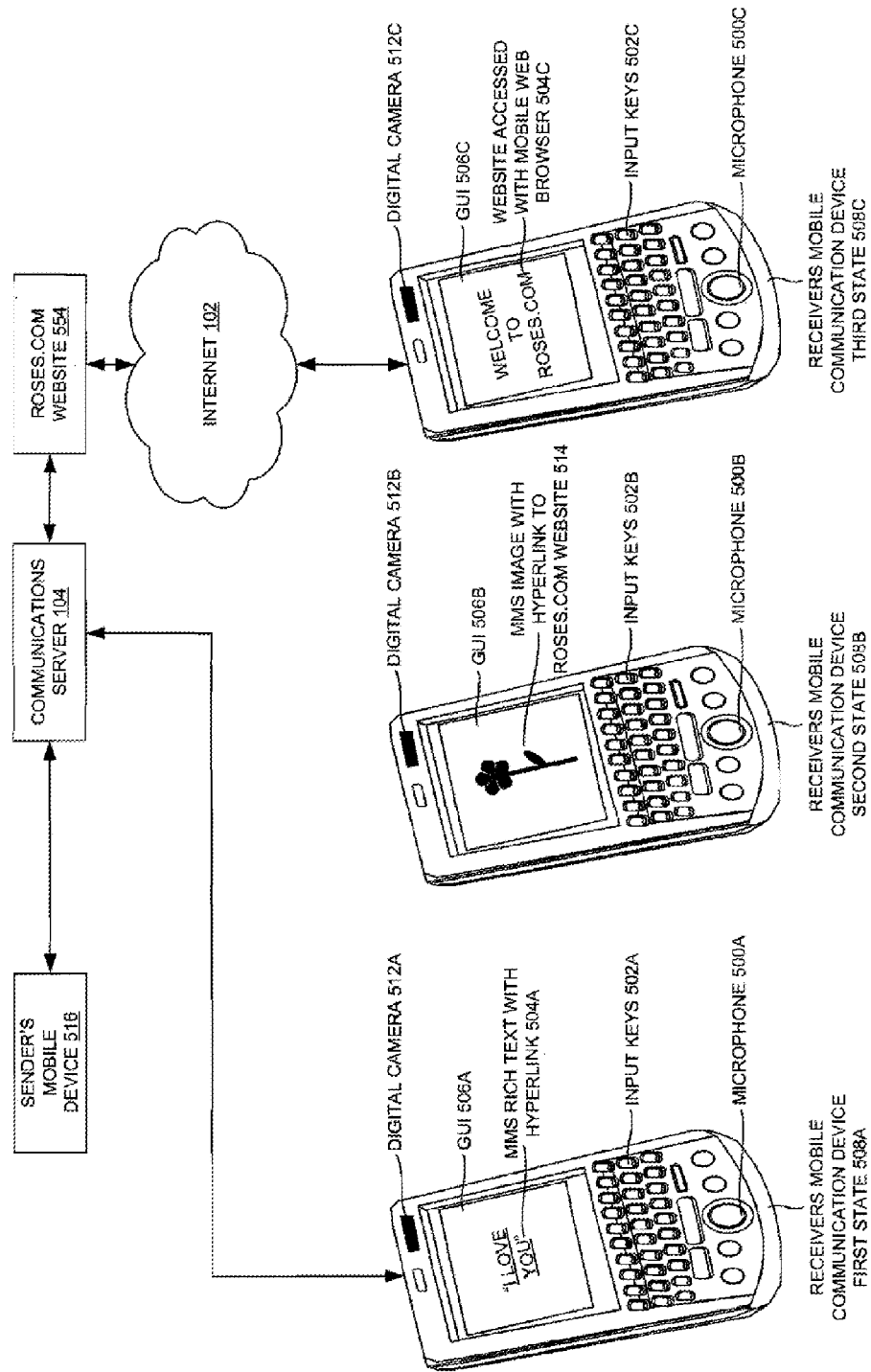
FIG. 5 is an user interface view illustrating an example from FIG. 3 of text message "I love you" and its appropriate presentation of context data, according to yet another embodiment.

FIG. 5 illustrates a user interface view of a receiver's mobile communication device 508A-C in three different states, according to yet another embodiment. Each state of the receiver's mobile communication device 508A-C is determined by information provided by the communications server 104 or the sender's mobile device 516.

For example, the sender's mobile device 516 may communicate an SMS message with a digital photograph of a rose to the communications server 104. The communications server 104 may process the information communicated by the sender's mobile device 616 according to the process of FIG. 16. The communications server 104 may generate an MMS message and communicate the MMS message to the receiver's mobile communication device. The MMS message may include the original text of the SMS text of the sender's mobile device 516. The MMS message may include hyperlinks. The MMS may include a hyperlink embedded in the enriched text of the MMS message. The user of the receiver's mobile communication device 508A may click on the hyperlink embedded in the text "I LOVE YOU" 504A in the first state and set the receiver's mobile communication device in a second state 508B with a GUI 506B presenting the digital image of the rose 514. The digital image of the rose 514 may include another hyperlink to roses.com website 554. The user of the receiver's mobile communication device 508B may click on the hyperlink embedded in the digital image of the rose 514 in the second state and set the receiver's mobile communication device 508C in the third state with a GUI 506C presenting the roses.com website 554.

Figure 6:
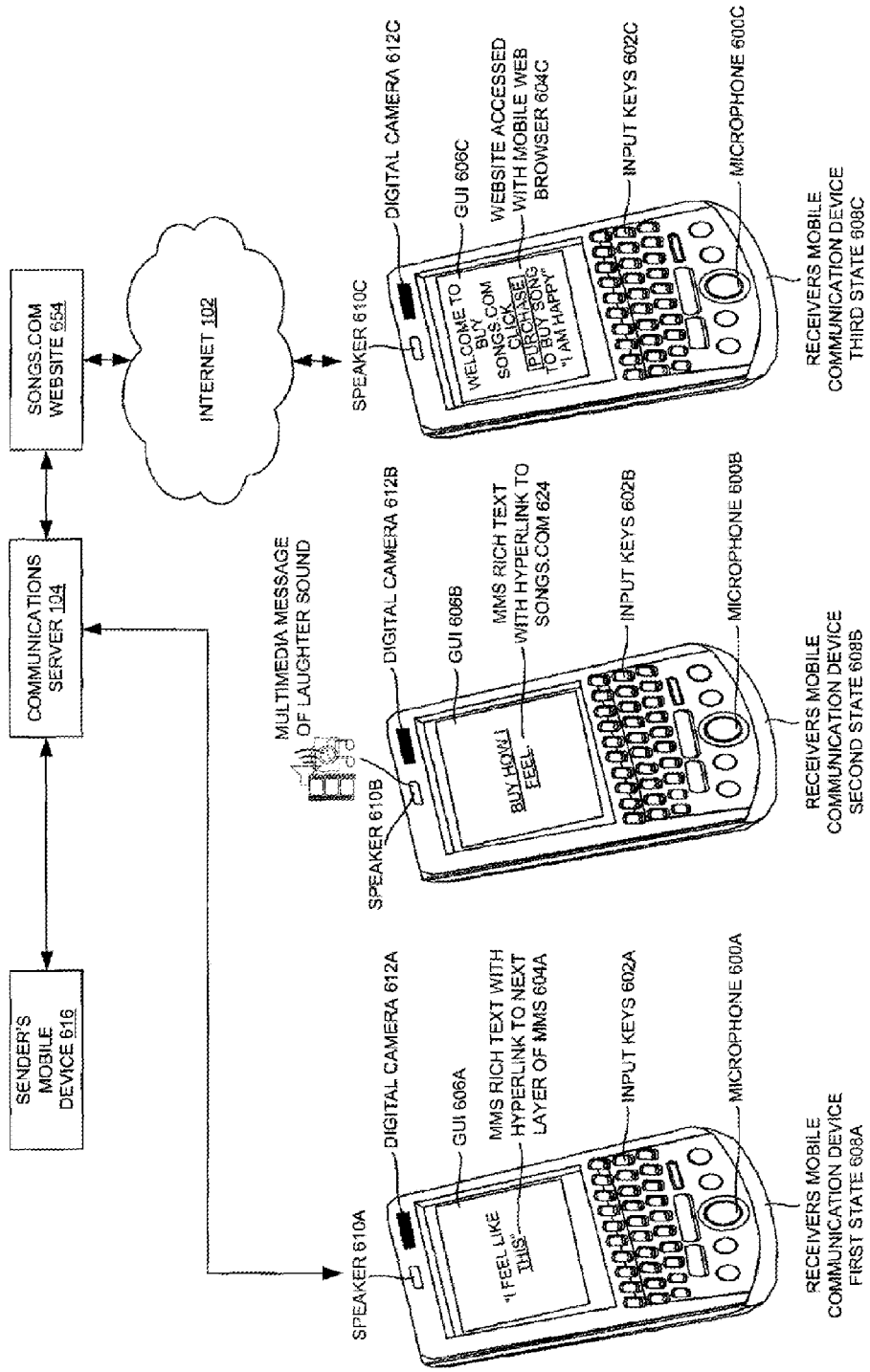
FIG. 6 is an user interface view illustrating an example from FIG. 3 of text message "I feel like this" and its appropriate presentation of context data, according to yet another embodiment.

FIG. 6 illustrates a user interface view of a receiver's mobile communication device 608A-C in three different states, according to yet another embodiment. Each state of the receiver's mobile communication device 608A-C is determined by information provided by the communications server 104 and/or the sender's mobile device 616.

For example, the sender's mobile device 616 may communicate an SMS text message with audio recording of sender laughing to the communications server 104. The communications server 104 may process the information communicated by the sender's device 616 according to the process of FIG. 16. The communications server 104 may generate an MMS message and communicate the MMS message to the receiver's mobile communication device 608A. The MMS message may be a multilayered MMS message. The MMS message may include the original text of the SMS text of the sender's mobile device 616. The MMS message may also include hyperlinks and an audio recording. The MMS may include a hyperlink embedded in the enriched text of the MMS message 604A. The user of the receiver's mobile communication device 608A may click on the hyperlink embedded in the text "I FEEL LIKE THIS" 604A in the first state and set the receiver's mobile communication device 608B in a second state with a speaker 610B presenting the audio recording of the user laughing. The GUI may present a text and a continuation of the MMS message with a hyper link to songs.com 604B. The continuation of MMS message may include the text "BUY HOW I FEEL". The user of the receiver's mobile communication device may click on the hyperlink embedded in the text "BUY HOW I FEEL" and set the receiver's mobile communication device in the third state 608C with a GUI 606C presenting the songs.com website 604C.

Figure 7:
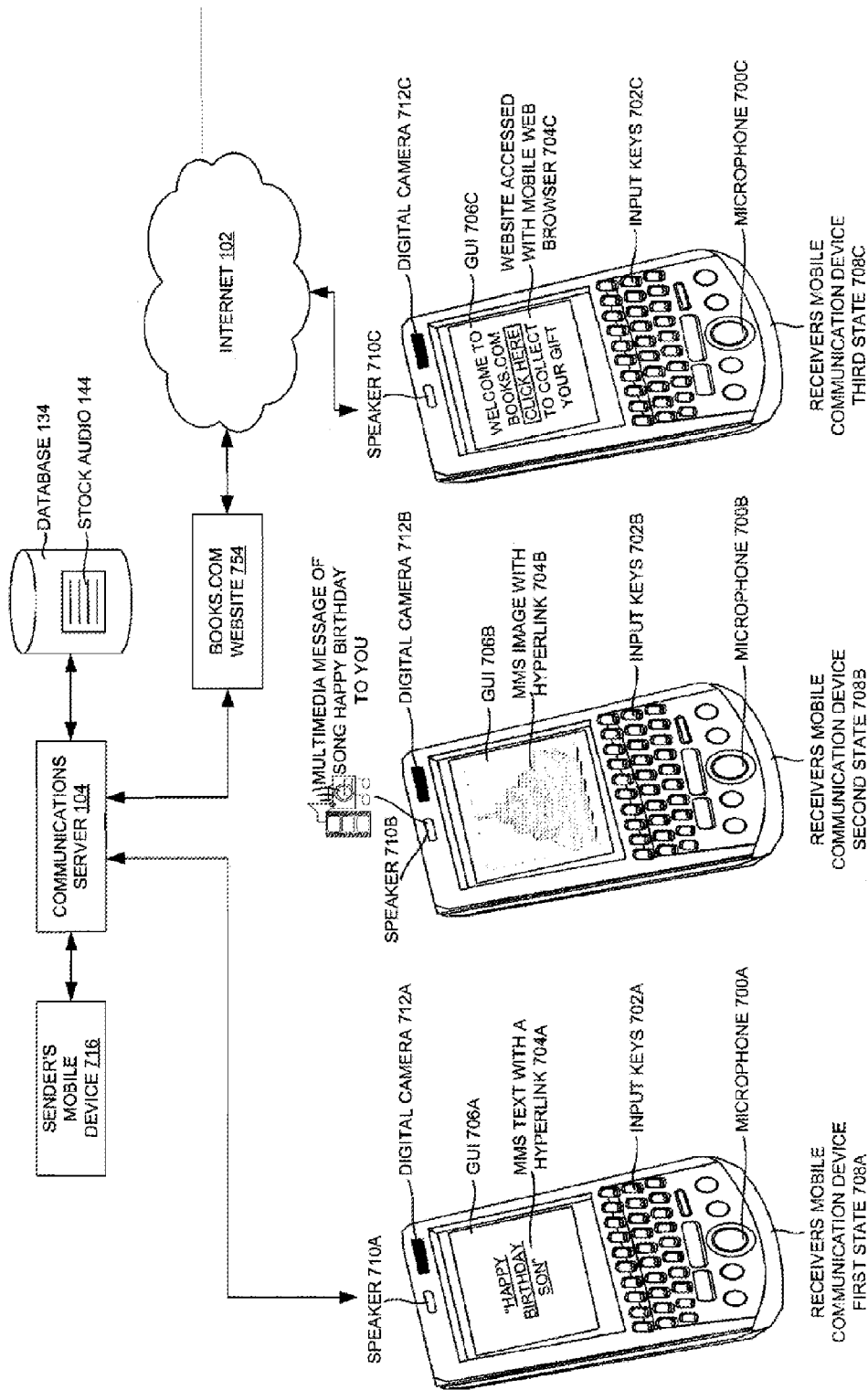
FIG. 7 is an user interface view illustrating an example from FIG. 3 of text message "happy birthday son" and its appropriate presentation of context data, according to yet another embodiment.

FIG. 7 illustrates a user interface view of a receiver's mobile communication device 708A-C in three different states, according to yet another embodiment. Each state of the receiver's mobile communication device 708A-C is determined by information provided by the communications server 104 and/or the sender's mobile device 716.

For example, the sender's mobile device 716 may communicate an SMS text message of "HAPPY BIRTHDAY SON" to the communications server 104. The communications server 104 may process the information communicated by the sender's mobile device 716 according to the process of FIG. 16. The communications server 104 may generate a multilayered MMS message and communicate the MMS message to the receiver's mobile communication device 708A. The MMS message may include the original text of the SMS text of the sender's mobile device 716. The MMS message may also include hyperlinks, a stock image of a birthday cake, and a stock audio recording of the song, 'Happy Birthday to You.' The stock audio recording may be acquired from the stock audio database stored in the database 134. The stock image of a birthday cake may be acquired from the database 134. The MMS message may include a hyperlink embedded in the enriched text of the MMS message 704A. The user of the receiver's mobile communication device 708A may click on the hyperlink embedded in the text "HAPPY BIRTHDAY SON" 704A in the first state and set the receiver's mobile communication device 708B in a second state with a speaker 710B presenting the audio recording of the of the song, 'Happy Birthday to You.' The GUI 706B may present a stock image of a birthday cake with a hyperlink to books.com 704B. The user of the receiver's mobile communication device may click on the hyperlink embedded in the stock image of a birthday cake and set the receiver's mobile communication device in the third state 708C with a GUI 706C presenting the books.com website 704C.

Figure 8:
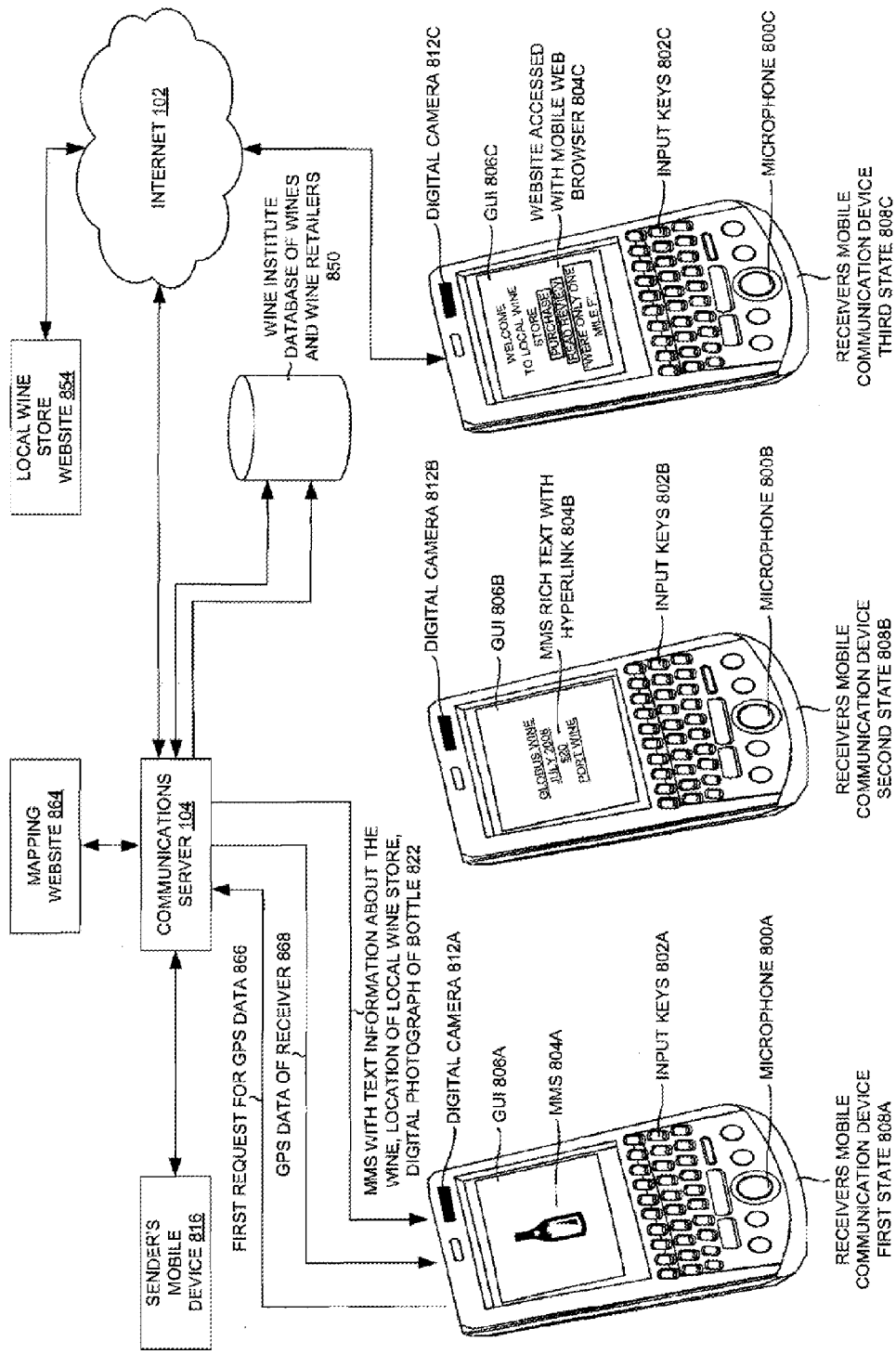
FIG. 8 is an user interface view illustrating an example from FIG. 3 of text message "none" and its appropriate presentation of context data, according to yet another embodiment.

FIG. 8 illustrates a user interface view of a receiver's mobile communication device 808A-C in three different states, according to yet another embodiment. Each state of the receiver's mobile communication device 808A-C is determined by information provided by the communications server 104 and/or the sender's mobile device 816.

For example, the sender's mobile device 816 may communicate a digital photograph of a wine bottle's bar code to the communications server 104. The communications server 104 may process the bar code information communicated by the sender's mobile device 816 according to the process of FIG. 16. The communications server 104 may communicate a request for GPS data from the receiver's mobile communication device 868. The receiver's mobile communication device 808A may communicate the GPS data to the communications server 104. The GPS data may provide a current location of the receiver's mobile communication device 808A. The communications server 104 may process the data to determine a local wine store with a local wine store website 854. The communications server 104 may generate a multilayered MMS message 822 and communicate the MMS message 822 to the receiver's mobile communication device 808A. The MMS message 822 may include an image of the wine bottle acquired from a local wine store website 854. The MMS message 822 may also include hyperlinks, text information about the wine acquired from the local wine store website and the local of the nearest local wine store that sells the wine. The MMS message 822 may include a hyperlink embedded in the image of the wine bottle. The user of the receiver's mobile communication device 808A may click on the hyperlink embedded in the image of the wine bottle 804A in the first state and set the receiver's mobile communication device 808B to a second state with a text of information about the wine product 804B. The user of the receiver's mobile communication device may click on the hyperlink embedded in the text and set the receiver's mobile communication device in the third state 808C. A web browser 804C of the receiver's mobile communication device 808C may access the local wine store website 854.

Figure 9:
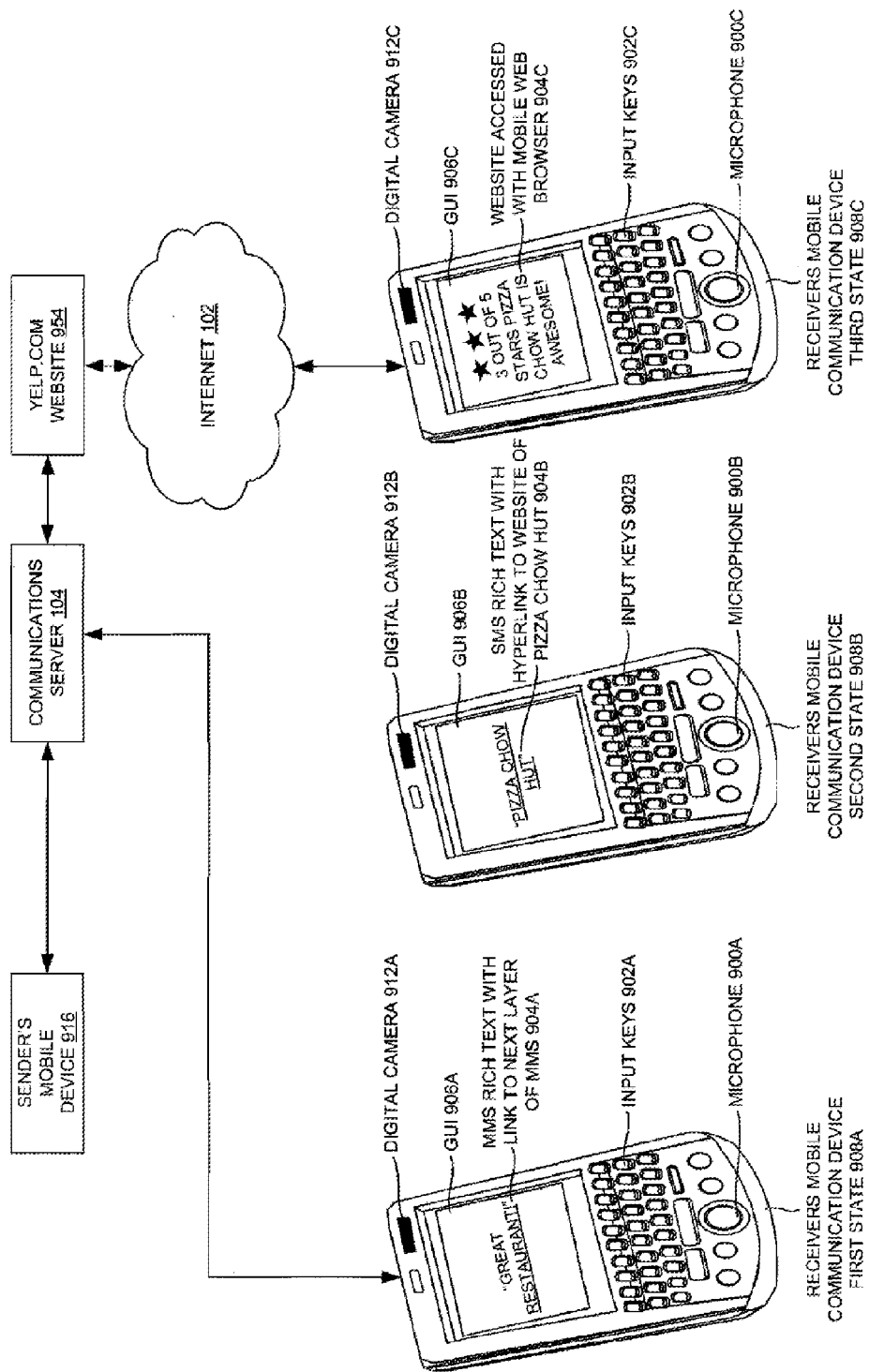
FIG. 9 is an user interface view illustrating an example from FIG. 3 of text message "great restaurant" and its appropriate presentation of context data, according to yet another embodiment.

FIG. 9 illustrates a user interface view of a receiver's mobile communication device 908A-C in three different states, according to yet another embodiment. Each state of the receiver's mobile communication device 908A-C is determined by information provided by the communications server 104 and/or the sender's mobile device 916.

For example, the sender's mobile device 916 may communicate an SMS message with the text "GREAT RESTAURANT" and a Radio-frequency identification (RFID) data to the communications server 104. The communications server 104 may process the SMS text message and an RFID data communicated by the sender's mobile device 916 according to the process of FIG. 16. The communications server 104 may use the RFID context data to identify restaurant referred to in the text of the SMS message. The communications server 104 may acquire a hyperlink to a review of the restaurant from a third-party website, yelp.com 954. The communications server 104 may generate a multilayered MMS message and communicate the MMS message to the receiver's mobile communication device 908A. The MMS message may include the original text of the SMS message. The MMS message may also include hyperlinks embedded in the image of the text "GREAT RESTAURANT". The user of the receiver's mobile communication device 908A may click on the hyperlink embedded in the text "GREAT RESTAURANT" 904A in the first state and set the receiver's mobile communication device 908B to a second state with a text of the name of the restaurant "PIZZA CHOW HUT" 904B. The user of the receiver's mobile communication device may click on the hyperlink embedded in the text and set the receiver's mobile communication device in the third state 908C. A web browser 904C of the receiver's mobile communication device 908C may access the review of the restaurant on the yelp.com website 954.

Figure 10:
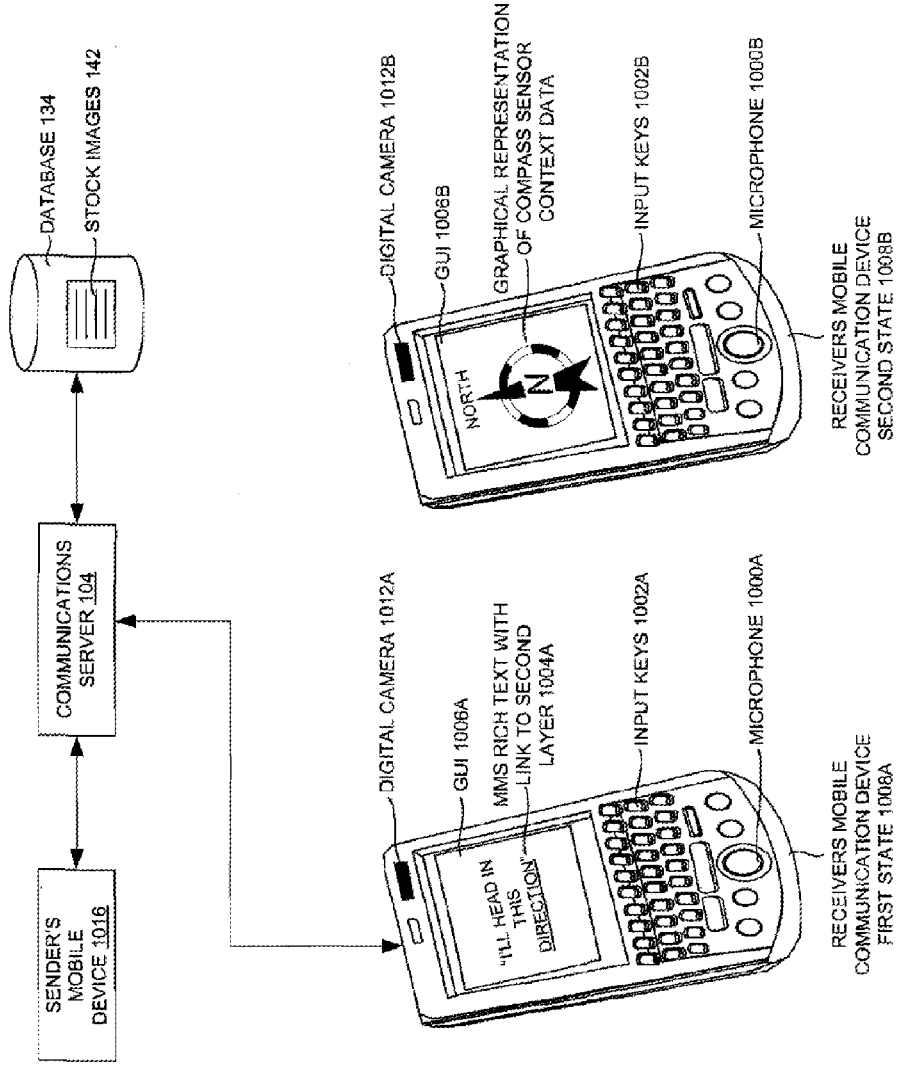
FIG. 10 is an user interface view illustrating an example from FIG. 3 of text message "I'll head in direction" and its appropriate presentation of context data, according to yet another embodiment.

FIG. 10 illustrates a user interface view of a receiver's mobile communication device 1008A-B in three different states, according to yet another embodiment. Each state of the receiver's mobile communication device 1008A-B is determined by information provided by the communications server 104 and/or the sender's mobile device 1016.

For example, the sender's mobile device 1016 may communicate an SMS message with the text "I'LL HEAD IN THIS DIRECTION" and a RFID data to the communications server 104. The communications server 104 may process the SMS text message and an RFID data communicated by the sender's mobile device 1016 according to the process of FIG. 16. The communications server 104 may acquire an image of a compass arrow pointing north from the stock images 142 of the database 134. The communications server 104 may generate a multilayered MMS message and communicate the MMS message to the receiver's mobile communication device 1008A. The MMS message may include the original text of the SMS message. The MMS message may also include hyperlinks embedded in the image of the text. The user of the receiver's mobile communication device 1008A may click on the hyperlink embedded in the text "DIRECTION" 1004A in the first state and set the receiver's mobile communication device 1008B to a second state with image of a compass arrow pointing north 1004B.

Figure 11:
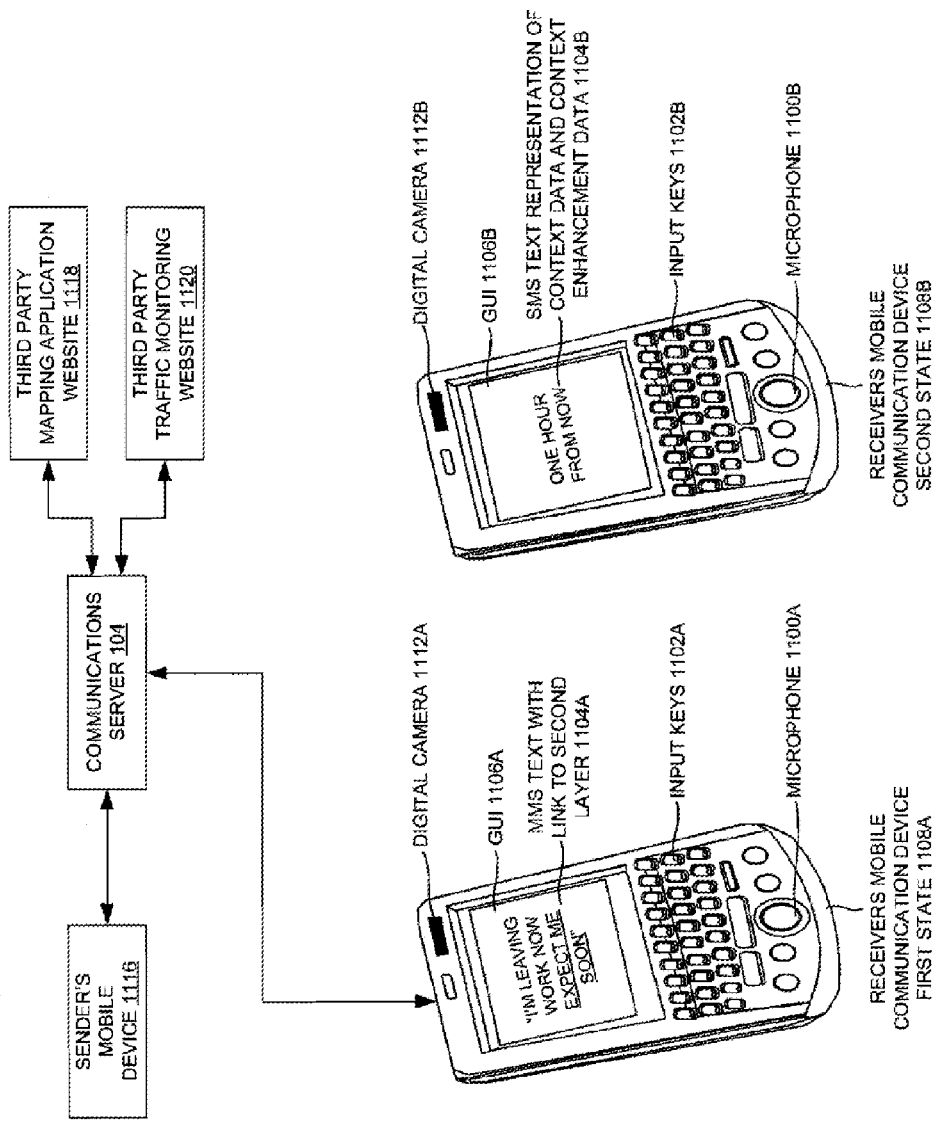
FIG. 11 is an user interface view illustrating an example from FIG. 3 of text message "I am leaving now expect me soon" and its appropriate presentation of context data, according to yet another embodiment.

FIG. 11 illustrates a user interface view of a receiver's mobile communication device 1108A-B in three different states, according to yet another embodiment. Each state of the receiver's mobile communication device 1108A-B is determined by information provided by the communications server 104 and/or the sender's mobile device 1116.

For example, the sender's mobile device 1116 may communicate an SMS message with the text "I'M LEAVING WORK NOW EXPECT ME SOON", GPS context data of the current location of the sender's mobile device 116 and/or an accelerometer context data. The accelerometer data may be generated by accelerating the sender's mobile device 116 according to a specified pattern. The communications server 104 may identify the specified pattern as an instruction to calculate a travel time from the sender's mobile device's current location to a predetermined location. The communications server 104 may acquire context enhancing data from a third party traffic monitoring website 1120 and a third party mapping application website 1118 to calculate the travel time. The communications server 104 may process the SMS text message and the GPS context data and the accelerometer context data communicated by the sender's mobile device 1116 according to the process of FIG. 16. The communications server 104 may generate a multilayered MMS message and communicate the MMS message to the receiver's mobile communication device 1108A. The MMS message may include the original text of the SMS message. The MMS message may also include a hyperlink embedded in the image of the text. The user of the receiver's mobile communication device 1108A may click on the hyperlink embedded in the text "EXPECT ME SOON" 1104A in the first state and set the receiver's mobile communication device 1108B to a second state with a text presenting the result of the calculated travel time 1104B.

Figure 12:
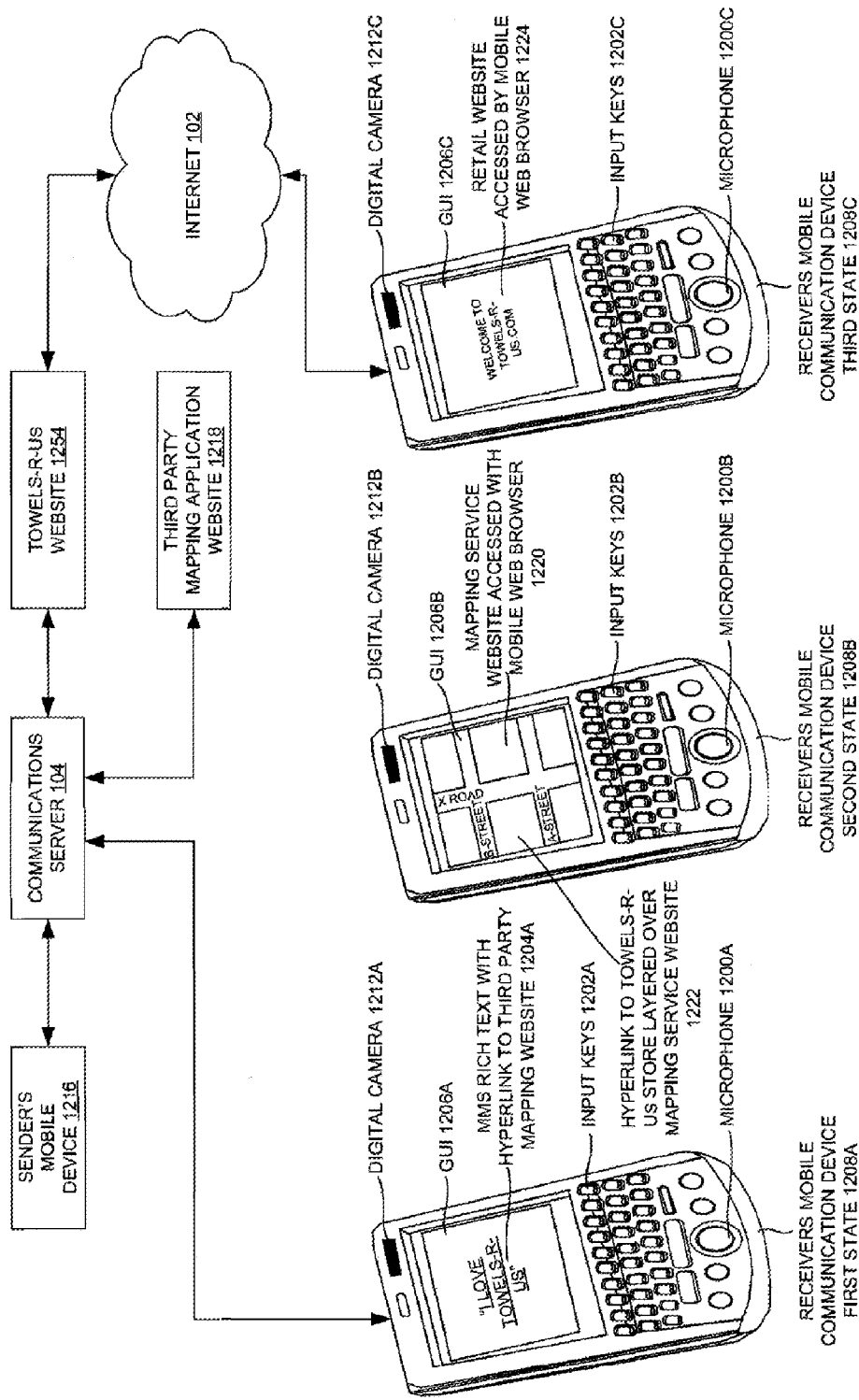
FIG. 12 is an user interface view illustrating an example from FIG. 3 of text message "I love towels-R-Us" and its appropriate presentation of context data, according to yet another embodiment.

FIG. 12 illustrates a user interface view of a receiver's mobile communication device 1208A-C in three different states, according to yet another embodiment. Each state of the receiver's mobile communication device 1208A-C may be determined by information provided by the communications server 104 and/or the sender's mobile device 1216.

For example, the sender's mobile device 1216 may communicate an SMS message with the text "I LOVE TOWELS-R-US" and wireless network context data. The communications server 104 may process the SMS text message and the wireless network context communicated by the sender's device 1216 according to the process of FIG. 16. The communications server 104 may use the wireless network context data to determine a location for a local Towels-R-Us store. The communications server 104 may generate a multilayered MMS message and communicate the MMS message to the receiver's mobile communication device 1208A. The MMS message may include the original text of the SMS message with an embedded hyperlink to a third party mapping application website with the location of the local Towels-R-Us store. The hyperlinks may include context enhancement data. The third party mapping application website with the location of the local Towels-R-Us store may include a hyperlink to Towels-R-Us.com 1222. The user of the receiver's mobile communication device 1208A may click on the hyperlink embedded in the text 1204A in the first state and set the receiver's mobile communication device 1208B to a second state with the third party mapping application website with the location of the local Towels-R-Us store. The user may click on the hyperlink to Towels-R-Us.com 1222 and set the receiver's mobile communication device 1208C to a third state presenting the Towels-R-Us.com retail website accessed by the mobile web browser 1224.

Figure 13:
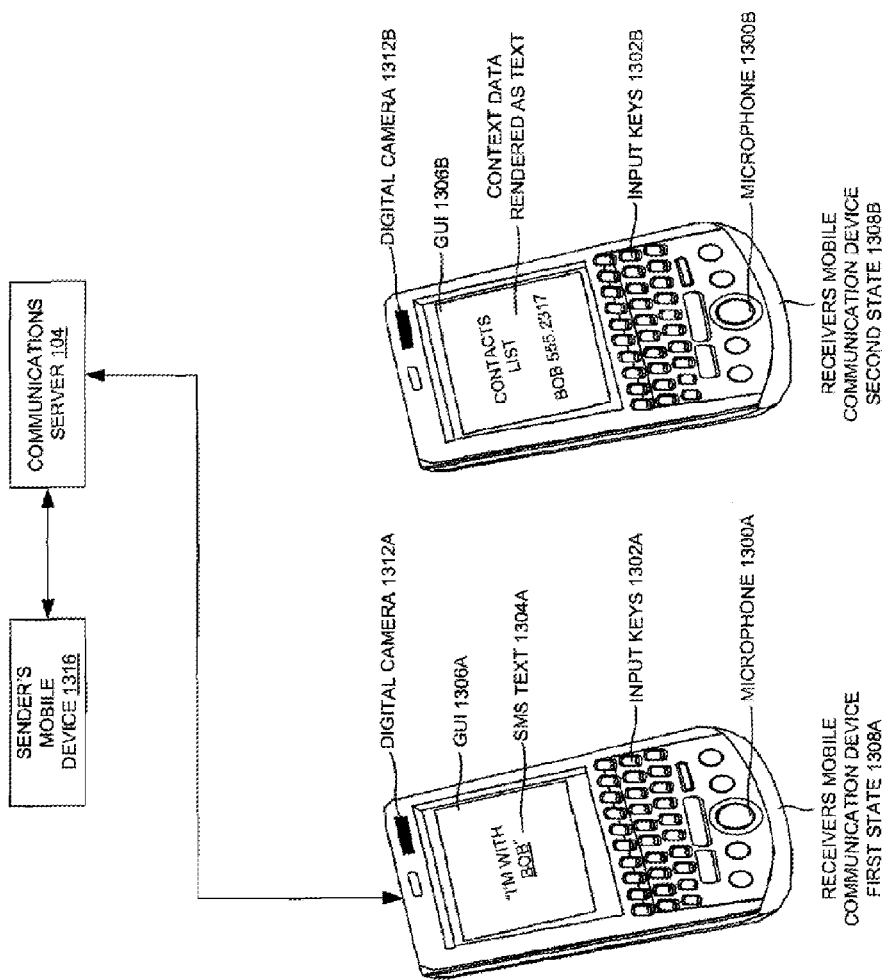
FIG. 13 is an user interface view illustrating an example from FIG. 3 of text message "I am with Bob" and its appropriate presentation of context data, according to yet another embodiment.

FIG. 13 illustrates a user interface view of a receiver's mobile communication device 1308A-B in three different states, according to yet another embodiment. Each state of the receiver's mobile communication device 1308A-B is determined by information provided by the communications server 104 and/or the sender's mobile device 1316.

For example, the sender's mobile device 1316 may communicate an SMS message with the text "I'M WITH BOB" and a contacts list context data. The communications server 104 may process the SMS text message contacts list context data communicated by the sender's mobile device 1316 according to the process of FIG. 16. The communications server 104 may generate a multilayered MMS message and communicate the MMS message to the receiver's mobile communication device 1308A. The MMS message may include the original text of the SMS message with an embedded hyperlink to a Bob's contacts list information. The user may click on the hyperlink in the text and set the receiver's mobile communication device in a second state 1308B to a third state 1308C presenting the Bob's contact information.

Figure 14:
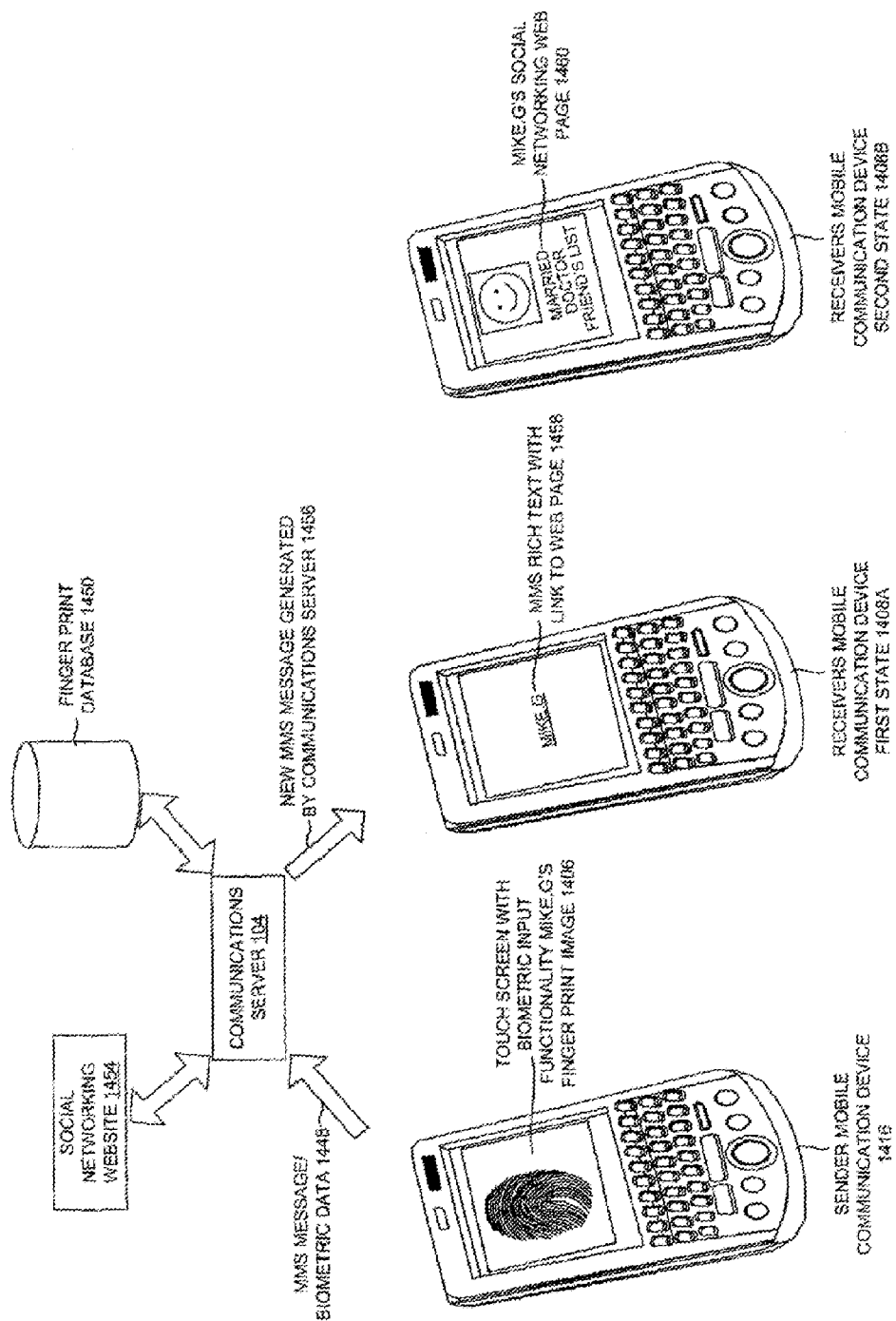
FIG. 14 is an user interface view illustrating an example of mobile communication device having touch screen with biometric input functionality, according to one embodiment.

FIG. 14 illustrates a user interface view of a receiver's mobile communication device 1408A-B in three different states, according to yet another embodiment. Each state of the receiver's mobile communication device 1408A-B is determined by information provided by the communications server 104 and/or the sender's mobile communication device 1416.

For example, the sender's mobile communication device 1416 may communicate a biometric context data including an MMS message 1448 of a finger print image. The touch screen may include a biometric input functionality. The touch screen may record a fingerprint image. The fingerprint image may be the biometric data communicated to the communications server 104. The communications server 104 may process the biometric context data according to the process of FIG. 16. The communications server 104 may acquire context enhancement data from a finger print data base 1450 and a social networking website 1454. The finger print may be from Mike G. The communications server 104 may acquire information from Mike G's social networking webpage. The communications server 104 may acquire personal and/or statistical information about Mike G. from the finger print data base 1450. The communications server 104 may generate a multilayered MMS message 1456 and communicate the MMS message 1456 to the receiver's mobile communication device 1408A. The MMS message 1456 may include Mike G's name with an embedded link to Mike G's social networking website. The user of the receiver's mobile communication device 1408A may click on the hyperlink embedded in Mike G's name 1408A in the first state and set the receiver's mobile communication device 1408B to a second state Mike G's social networking webpage.

According to several embodiments, the mobile communications device 108A-N may be adapted to receive and/or communicate other context data types. Other context data types include, inter alia, thermal context data, humidity context data, pressure context data and ambient light context data. For example, the mobile communications device 108A-N may track thermal, pressure and humidity ambient conditions. Furthermore, the communications server may 104 may acquire thermal context enhancement data, humidity context enhancement data, pressure context enhancement data and ambient light context enhancement data from a third-party source. The mobile communications device 108A-N may also allow the user to compose music. The composed music may be communicated to the communications server 104 as a context data.

For example, the mobile communications device 108A-N may include a song composition application. A user may compose a song and want to share it with a friend. However, rather than sharing the finished product (e.g. a complete song in .mpg format), the user may send the sequence of notes. A may note corresponds to touch on the X-Y plane surface of a touchscreen of the mobile communications device 108A-N. Each note may include a distinct item of context data. For example, in a particular embodiment, the mobile communications device 108A-N may be an iPhone® and the song composition application may be Ocarina™. the iPhone® may include a background software that captures each instance of touch (e.g. a keystroke capture software). A user may associate a series of context data notes to a particular text of a SMS message. If a receiving party also has Ocarina™, the receiving party may also experience the same sequence of notes of the song when accessing the particular text of the SMS message that has been processed by the communications server 104.

Figure 15:
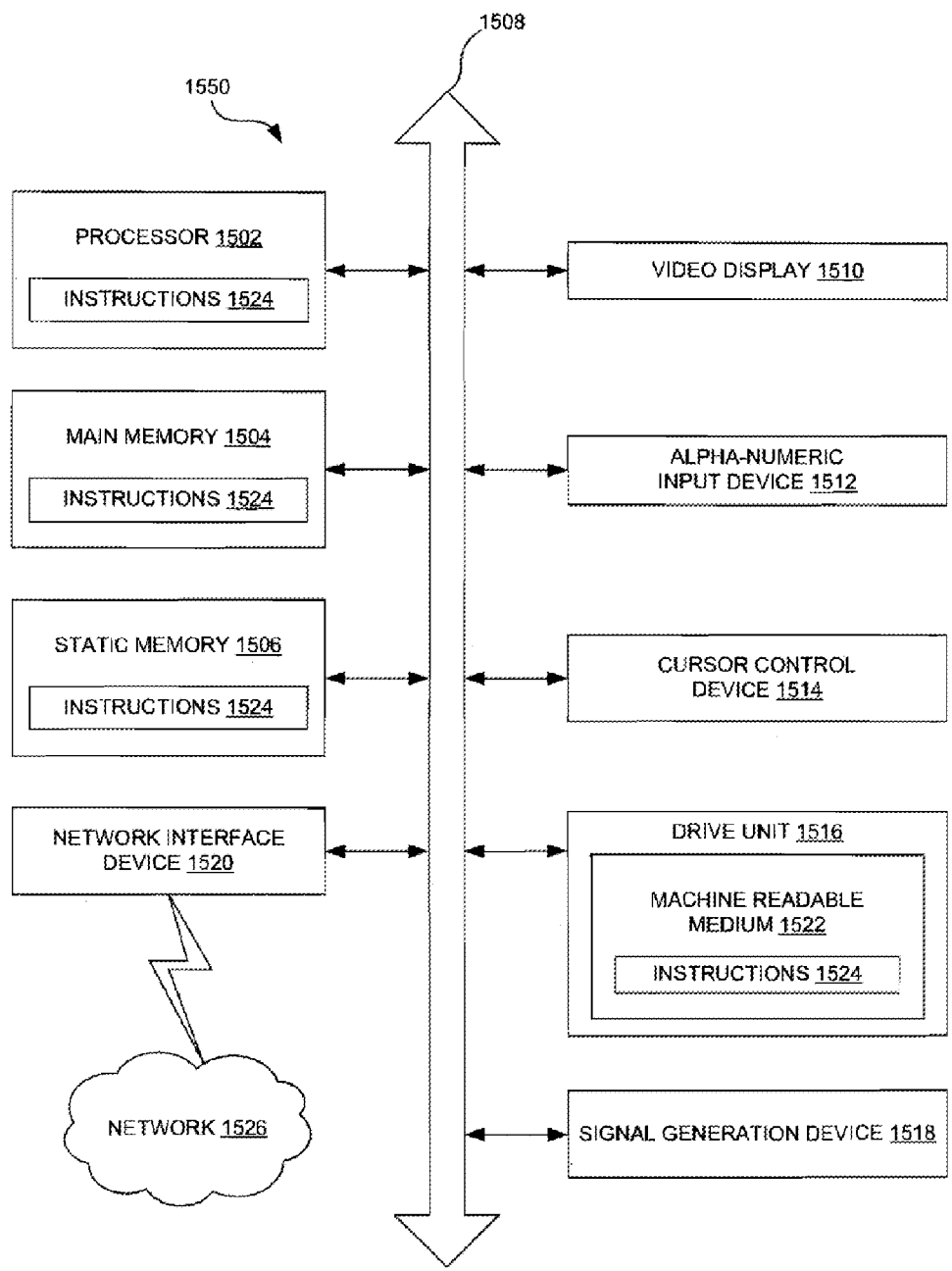
FIG. 15 is a diagrammatic system view of a data processing system in which any of the embodiments disclosed herein may be performed, according to one embodiment.

FIG. 15 is a diagrammatic system view of a data processing system in which any of the embodiments disclosed herein may be performed, according to one embodiment. Particularly, the diagrammatic system view 1500 of FIG. 15 illustrates a processor 1502, a main memory 1504, a static memory 1506, a bus 1508, a video display 1510, an alpha-numeric input device 1512, a cursor control device 1514, a drive unit 1513, a signal generation device 1518, a network interface device 1520, a machine readable medium 1522, instructions 1524, and a network 1526, according to one embodiment.

The diagrammatic system view 1500 indicates a personal computer and/or the data processing system in which one or more operations disclosed herein are performed. The processor 1502 is a microprocessor, a state machine, an application specific integrated circuit, a field programmable gate array, etc. (e.g., Intel® Pentium® processor). The main memory 1504 is a dynamic random access memory and/or a primary memory of a computer system.

The static memory 1506 may be a hard drive, a flash drive, and/or other memory information associated with the data processing system. The bus 1508 is an interconnection between various circuits and/or structures of the data processing system. The video display 1510 provides graphical representation of information on the data processing system. The alpha-numeric input device 1512 may be a keypad, a keyboard and/or any other input device of text (e.g., a special device to aid the physically handicapped).

The cursor control device 1514 is a pointing device such as a mouse. The drive unit 1516 may be the hard drive, a storage system, or other longer term storage subsystem. The signal generation device 1518 includes a bios or a functional operating system of the data processing system. The network interface device 1520 includes a device that performs interface functions such as code conversion, protocol conversion or buffering required for communication to and from the network 1526. The machine readable medium 1522 provides instructions on which any of the methods disclosed herein may be performed. The instructions 1524 provides source code or data code to the processor 1502 to enable any one or more operations disclosed herein.

Figure 16:
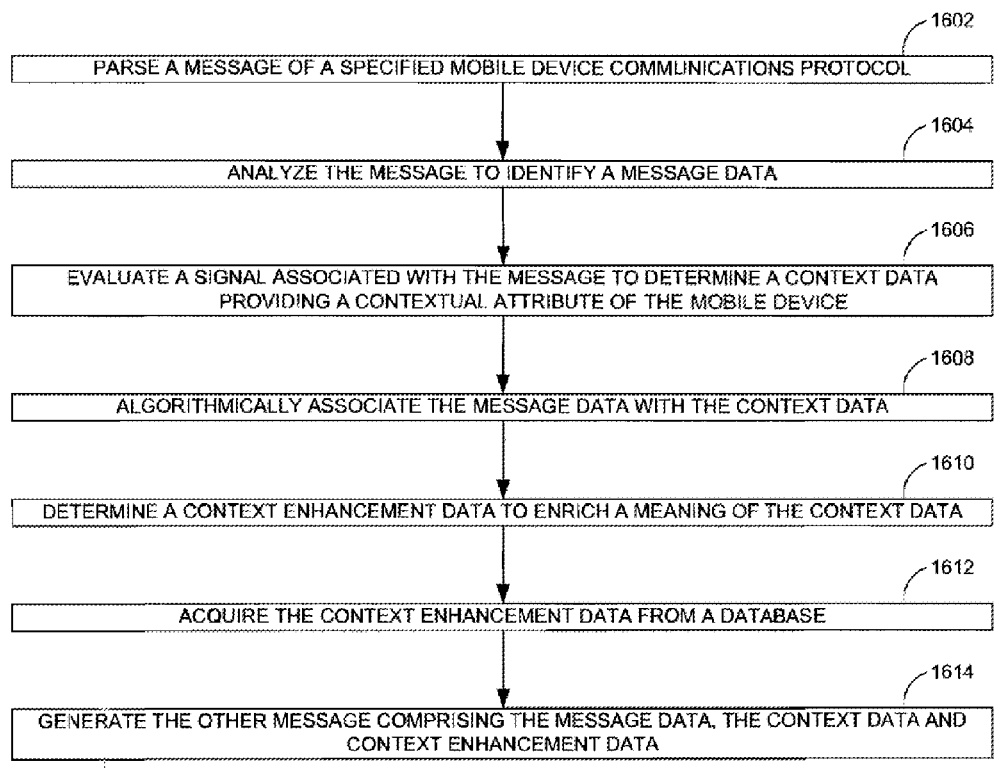
FIG. 16 is a process flow illustrating parsing a message of a specified mobile device communication protocol to generate the other message, according to one embodiment.

FIG. 16 is a process flow illustrating parsing a message of a specified mobile device communication protocol to generate the other message, according to one embodiment. In operation 1602, a message of a specified mobile device communications protocol is parsed. For example, a parser module 118 of the communications server 104 may be used to parse the message. In operation 1604, the message to identify a text data is analyzed. For example, a text analysis module 120 may analyze the message. In operation 1606, a signal associated with the message is evaluated to determine a context data providing a contextual attribute of the message. For example, the context analysis module 122 may evaluate the signal.

In operation 1608, the text data is algorithmically associated with the context data. For example, the collation module 124 may associate the text data with the context data. In operation 1610, a context enhancement data is determined to enrich a meaning of the context data. In operation 1612, the context enhancement data is acquired from a database 134. In operation 1614, the other message is generated. The other message includes message data, the context data and context enhancement data.

Figure 17:
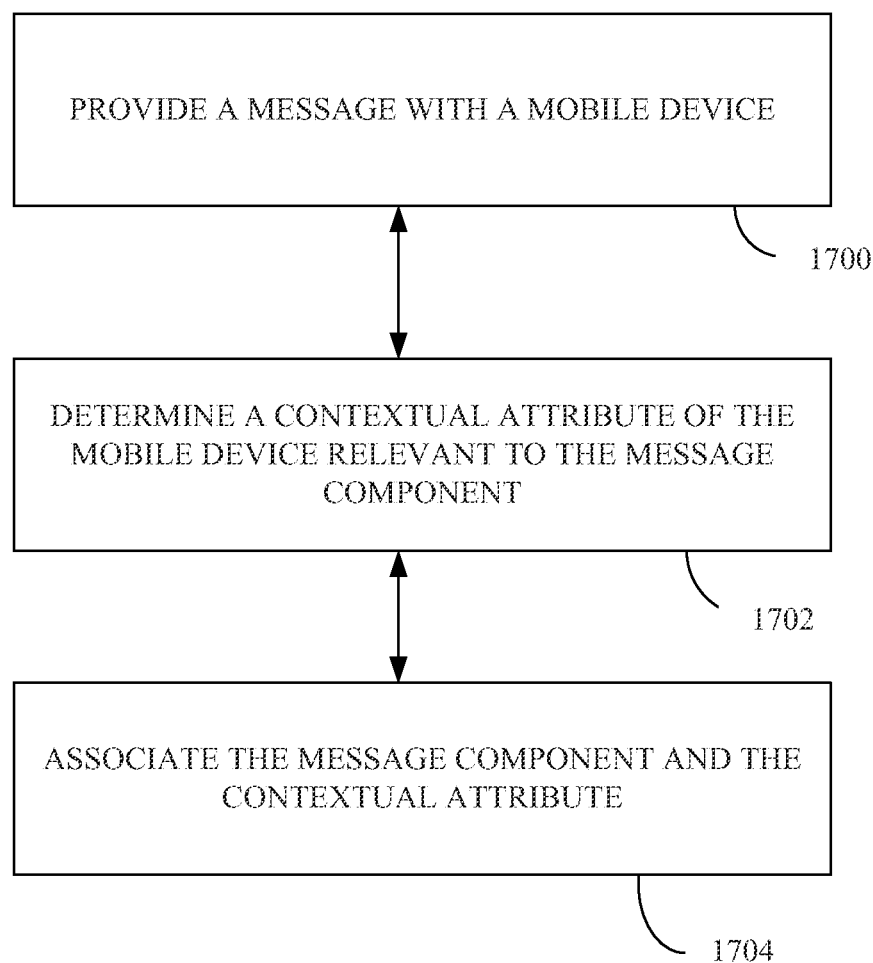
FIG. 17 is a process flow illustrating the identification of component $\mu$ of a signal $\lambda$, according to one embodiment.

FIG. 17 is a process flow illustrating another example of a computer-implemented method of one or more embodiments. In operation 1702, a message is provided with a mobile device. For example, the sender's mobile device 106 A-N configured as the computer of FIG. 17 may be utilized to provide an SMS or MMS message. In operation 1704, a contextual attribute of the mobile device relevant to a message component is determined. FIGS. 3 A-C illustrate examples of determining certain context attributes relevant to the listed.example message components. In operation 1706, the message component and the contextual attribute may be associated. Again, in one example embodiment, FIGS. 3 A-C illustrate example methods of performing operation 1706 according to one embodiment.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry, firmware, software or any combination of hardware, firmware, or software embodied in a machine readable medium. For example, the various electrical structure and methods may be embodied using transistors, logic gates, application specific integrated (ASIC) circuitry or Digital Signal Processor (DSP) circuitry.

In addition, it will be appreciated that the various operations, processes, and methods disclosed herein may be embodied in a machine-readable medium or a machine accessible medium compatible with a data processing system, and may be performed in any order. Accordingly, the Specification and Drawings are to be regarded in an illustrative rather than a restrictive sense.

What is claimed is:

1. A method of a messaging service server comprising:
parsing a message generated by a mobile device with a messaging service server;
identifying a message component of the message;
algorithmically determining a contextual attribute of the mobile device related to the message component;
deriving a context data from the contextual attribute, wherein the context data describes an environmental condition or a physical event associated with the mobile device that originated the message component;
algorithmically associating the message component with the context data;
generating a context-enriched message comprising the message component and the context data;
determining a context enhancement data to enrich a meaning of the context data; and
acquiring the context enhancement data from a database;
generating the context-enriched message comprising the message component, the context data and context enhancement data;

rendering the other message to enable at least one of the context data and the context
enhancement data to enhance the meaning of the message component with a user interface, wherein the user interface comprises at least one of a graphical user interface device, an audio interface device and a haptic interface device;
algorithmically evaluating the message to determine a biometric context data as the contextual attribute of the mobile device related to the message component;
algorithmically associating the text data with the biometric context data;
generating the context-enriched message to correlate the text data with the biometric context data;
wherein the context enhancement data is acquired from a source other than a mobile device that originated the message component,
wherein the context enhancement data comprises at least one of a social network context data, a data retrieved from a third-party database and referent to another message context data,
wherein the context data a virtual condition-with the mobile device that originated the message component,
wherein the message component comprises at least one of a text data of a short messaging service and a media data of a multimedia messaging service, and
wherein the context data is algorithmically acquired by at least one of a global positioning device, a digital camera, a digital recorder, a radio frequency-identification receiver, a wireless network receiver, an accelerometer an a gyroscope.

2. The method of claim 1 further comprising:
manually specifying the message data.

3. The method of claim 1, wherein a machine is caused to perform the method of claim 1 when a set of instructions in a form of a machine-readable medium is executed by the machine.

4. A system comprising:
a communications server;
a parser module of the communications server that parses a message of a specified communications protocol;
a text analysis module that determines meaning of a message data;
a context determiner module that determines a contextual attribute of at least one of the message data and a device that generated or received the message, and that derives a context data from the contextual attribute, and wherein the contextual attribute is related to the meaning of the message data, and wherein the context data describes an environmental condition or a physical event associated with the mobile device that originated the message component;
a context enhancement module that determines a context enhancement data to enrich a meaning of the context data and that acquires the context enhancement data from a database;
a collation module that associates the message data with the context data; and
a message module that generates another message comprising the message data, the context data and the context enhancement data,
wherein the context analysis module processes the context data to enable a presentation of the context data with a user interface,
wherein the message module modifies the message to render the context data and the context enhancement data with the user interface;

wherein the user interface comprises at least one of a graphical user interface device, an audio interface device and a haptic interface device and wherein the context data comprises at least one of a global positioning system context data, an image context data, an audio context data, a video context data, a bar code context data, a radio frequency-identification context data, a compass sensor context data, a gyroscope context data, a wireless network context data, an accelerometer context data, a contacts list context data and a biometric context data;

and algorithmically evaluating the message to determine a biometric context data as the contextual attribute of the mobile device related to the message component;

algorithmically associating the text data with biometric context data;

generating the context-enriched data to correlate the text data with biometric context data;

wherein the context enhancement data is acquired from a source other than a mobile device that originated the message component;

wherein the context enhancement data comprises at least one of social networking context data, a data retrieved from a third-party database and referent to another message con text data;

wherein the context data a virtual condition with the mobile device that originated the message component;

wherein the message component comprises at least one of a text data of a short messaging service and a media data of a multimedia messaging service.

5. The system of claim 4:

further comprising a feedback module that determine a manually specified text of the message, and that identifies a clarifying context data related to the manually specified text, and that updates the message to correlate the manually specified text with the clarifying context data, and wherein the message data comprises at least one of a short messaging service message and a multimedia messaging service message.

6. A computer-implemented method comprising:

providing a message with a mobile device;

algorithmically determining a contextual attribute of the mobile device relevant to a message component, and wherein the contextual attribute comprises an attribute of an environmental attribute or a physical attribute of the mobile device that originated the message component; and linking the message component and the contextual attribute in a multimedia messaging system {MMS) message;

wherein the link of the message component and the contextual attribute comprises embedding a hyperlink in a graphical rendering of the message component, and wherein the hyperlink references a document generated by a web mapping service application;

determining a context enhancement data to enrich a meaning of the context data and acquiring the context enhancement data from a database;

generating the context-enriched message comprising the message component, the context data and context enhancement data;

rendering the other message to enable at least one of the context data and the context enhancement data to enhance the meaning of the message component with a user interface, wherein the user interface comprises at least one of a graphical user interface device, an audio device and a haptic device;

algorithmically evaluating the message to determine a biometric contex data as the contextual attribute of the mobile device related to the message component;

algorithmically associating the text data with biometric context data;

generating the context-enriched data to correlate the text data with biometric context data;

wherein the context enhancement data is acquired from a source other than a mobile device that originated the message component;

wherein the context enhancement data comprises at least one of social networking context data, a data retrieved from a third-party database and referent to another message con text data;

wherein the context data a virtual condition with the mobile device that originated the message component;

wherein the message component comprises at least one of a text data of a short messaging service and a media data of a multimedia messaging service;

wherein the context data is algorithmically acquired by at least one of a global positioning device, a digital camera, a digital recorder, a radio frequency-identification received, a wireless network receiver and an accelerometer and a gyroscope.

* * * * *